(12) United States Patent
Yasuda et al.

(10) Patent No.: US 7,320,217 B2
(45) Date of Patent: Jan. 22, 2008

(54) LOAD CONTROLLER FOR HYDROSTATIC TRANSMISSION IN WORK VEHICLES

(75) Inventors: Toshifumi Yasuda, Amagasaki (JP); Shigenori Sakikawa, Amagasaki (JP); Kazuhiko Ohtsuki, Amagasaki (JP)

(73) Assignee: Kanzaki Kokyukoki Mfg. Co., Ltd., Amagasaki-shi, Hyogo (JP)

( * ) Notice: Subject to any disclaimer, the term of this patent is extended or adjusted under 35 U.S.C. 154(b) by 149 days.

(21) Appl. No.: 10/553,099

(22) PCT Filed: Apr. 14, 2004

(86) PCT No.: PCT/JP2004/005287

§ 371 (c)(1),
(2), (4) Date: Oct. 13, 2005

(87) PCT Pub. No.: WO2004/102043

PCT Pub. Date: Nov. 25, 2004

(65) Prior Publication Data

US 2006/0254268 A1    Nov. 16, 2006

(30) Foreign Application Priority Data

Apr. 14, 2003 (JP) ............................. 2003/109359
Oct. 16, 2003 (JP) ............................. 2003/356052

(51) Int. Cl.
*F16D 31/02* (2006.01)
(52) U.S. Cl. ........................................ 60/468; 60/431
(58) Field of Classification Search .................. 60/431, 60/468
See application file for complete search history.

(56) References Cited

U.S. PATENT DOCUMENTS

| 4,776,165 A | 10/1988 | Iino |
| 5,596,872 A | 1/1997 | Payne |
| 5,679,085 A | 10/1997 | Fredriksen et al. |
| 5,836,158 A | 11/1998 | Nakajima |

FOREIGN PATENT DOCUMENTS

EP        0 301 918        2/1989

(Continued)

OTHER PUBLICATIONS

Supplementary European Search Report by The European Patent Office on Aug. 2, 2006.

*Primary Examiner*—Michael Leslie
(74) *Attorney, Agent, or Firm*—Knobbe Martens Olson & Bear LLP

(57) ABSTRACT

Disclosed is a load controller for use in a hydrostatic transmission for a work vehicle. Power supplied from an engine is branched to drive an implement system and a traveling system. The hydrostatic transmission connects, in an oil-hydraulic closed circuit, an oil-hydraulic pump driven by the engine and an oil-hydraulic motor driven by the oil-hydraulic pump. The load controller includes a bypass oil line for bypassing an oil line that has high pressure during forward movement in the oil-hydraulic closed circuit to reach an oil line that has low pressure during forward movement or an oil tank; a first opening/closing valve for opening or closing the bypass oil line; and an opening/closing valve controller that detects a load applied to the engine while traveling during working and opens the first opening/closing valve when the load exceeds a predetermined level.

15 Claims, 20 Drawing Sheets

FOREIGN PATENT DOCUMENTS

| | | |
|---|---|---|
| GB | 941289 A | 11/1963 |
| JP | 1978-104886 A | 1/1977 |
| JP | 02 159469 A | 6/1990 |
| JP | 6-265013 A | 9/1994 |
| JP | 9-079375 A | 3/1997 |
| JP | 9-100909 | 4/1997 |
| JP | 10-184906 A | 7/1998 |
| JP | 10-252877 A | 9/1998 |

(a)

(b)

LOAD CONTROLLER FOR HYDROSTATIC TRANSMISSION IN WORK VEHICLES

TECHNICAL FIELD

The present invention relates to a load controller for a hydrostatic transmission (HST) mounted on a work vehicle, such as a snowplow, a farm tractor, etc.

BACKGROUND ART

Usually, a snowplow, a farm tractor or like work vehicle is structured so that an auger or the like is driven using power that is branched and output from an engine or a power transmission system.

For example, a snowplow comprises, as shown in FIG. 8, a controller 100, an engine chamber 101, an auger 102, a blower 103, a duct 104, and a crawler 105. Output from an output shaft 106 is branched into a PTO shaft 111 (implement system) for driving the auger 102 and a drive shaft 112 (traveling system) of the crawler 105 via pulleys 107 to 110. Rotational driving force is transmitted from the drive shaft 112 to an axle 114 via a transmission 113. A hydrostatic transmission is often used in such a work vehicle as a speed change gear.

However, if an auger or like implement system becomes overloaded for some reason while such a work vehicle is in working operation, the engine may stop. Even if the engine does not stop, the rotation becomes less than ideal for driving an implement, greatly reducing workability (work efficiency).

In the case of a snowplow, the auger 102 is smoothly rotated and snow can be removed when clearing fresh snow. However, when clearing spring snow, since the snow has a high moisture content, the duct 104 tends to become blocked with snow. This may result in an engine failure, because an excessive load is applied to the engine via the auger.

In prior art work vehicles provided with a hydrostatic transmission, a mechanical control means and an electronic control means are known for preventing the engine from stalling and for maintaining the engine speed at the most desirable level for operation.

A mechanical control means is disclosed in, for example, Japanese Unexamined Patent Publication No. 1998-184906. This control means comprises an overload prevention system that reduces overload by providing an elastic body between a variable displacement oil-hydraulic pump and a controller to control the variable displacement of the pump.

An electronic control means is disclosed in, for example, Japanese Unexamined Patent Publication No. 1997-79375. In this control means, an oil-pressure sensor is provided in an oil-hydraulic line in a hydrostatic transmission, and a swash plate in the oil-hydraulic pump is controlled by an electric motor using an electronic-control means based on electrical data regarding the oil pressure in the pump that is detected by the oil-pressure sensor.

However, in the mechanical control means disclosed in Japanese Unexamined Patent Publication No. 1998-184906, control becomes difficult due to the deterioration of the elastic body with the passage of time.

Furthermore, the electronic control means disclosed in Japanese Unexamined Patent Publication No. 1997-79375 requires a large actuator (i.e., electric motor, etc.), because the swash plate has to be driven against the oil pressure. Furthermore, it is necessary to release the interlock between the gearshift and the swash plate while placing the gearshift near the operator's hand in the traveling position that has been determined by the operator, and then to switch to the interlock between the swash plate and the control actuator, making the structure complicated.

DISCLOSURE OF THE INVENTION

The present invention provides a load controller for use in a hydrostatic transmission for a work vehicle that is free from control failure caused by deterioration of the constituent components, and that can be miniaturized and simplified in structure compared to conventional load controllers.

The above object can be achieved by a load controller provided in a hydrostatic transmission for a work vehicle, wherein power supplied from an engine is branched to drive an implement system and a traveling system, and a hydrostatic transmission is provided in the traveling system; the hydrostatic transmission connecting, via an oil-hydraulic closed circuit, an oil-hydraulic pump driven by the engine and an oil-hydraulic motor driven by the oil-hydraulic pump; the load controller comprising a bypass oil line for bypassing an oil line that has high pressure during forward movement in the oil-hydraulic closed circuit to reach an oil line that has low pressure during forward movement or an oil tank; an opening/closing valve for opening or closing the bypass oil line; and an opening/closing valve controller that detects a load applied to the engine while traveling during working and opens the opening/closing valve when the load exceeds a predetermined level.

In the present invention, an oil line that has high pressure during forward movement in an oil-hydraulic closed circuit of the hydrostatic transmission (HST) is connected to an oil line that has low pressure during forward movement or an oil tank via an opening/closing valve so as to route the high-pressure working oil to a low-pressure oil line or an oil tank when an overload is applied to the engine. Therefore, it is possible to eliminate the overload by reducing the power distribution ratio to the traveling system, and increasing the power distribution ratio to an implement. As a result, a large electric motor as used in a conventional load controller becomes unnecessary, and the load can be controlled by using a small opening/closing valve. Furthermore, because no cushioning elastic body is used, the occurrence of control failure caused by deterioration of constituent components with time is also reduced.

Examples of means for detecting loads which act on an engine include detecting a reduction in engine revolutions, detecting increase in the load torque that acts on an output shaft of an engine, detecting an increase in the temperature of exhaust that is emitted from an engine, and detecting a reduction in the pressure of working oil that flows in a hydrostatic transmission, etc.

BEST MODE FOR CARRYING OUT THE INVENTION

Preferable embodiments of the present invention are explained below with reference to drawings. In the below-explained embodiments, a snowplow is used as an example of a work vehicle. Note that the same symbol is applied to similar components in all figures including those showing prior art techniques, and repetitive explanations may be omitted.

Figure 1:
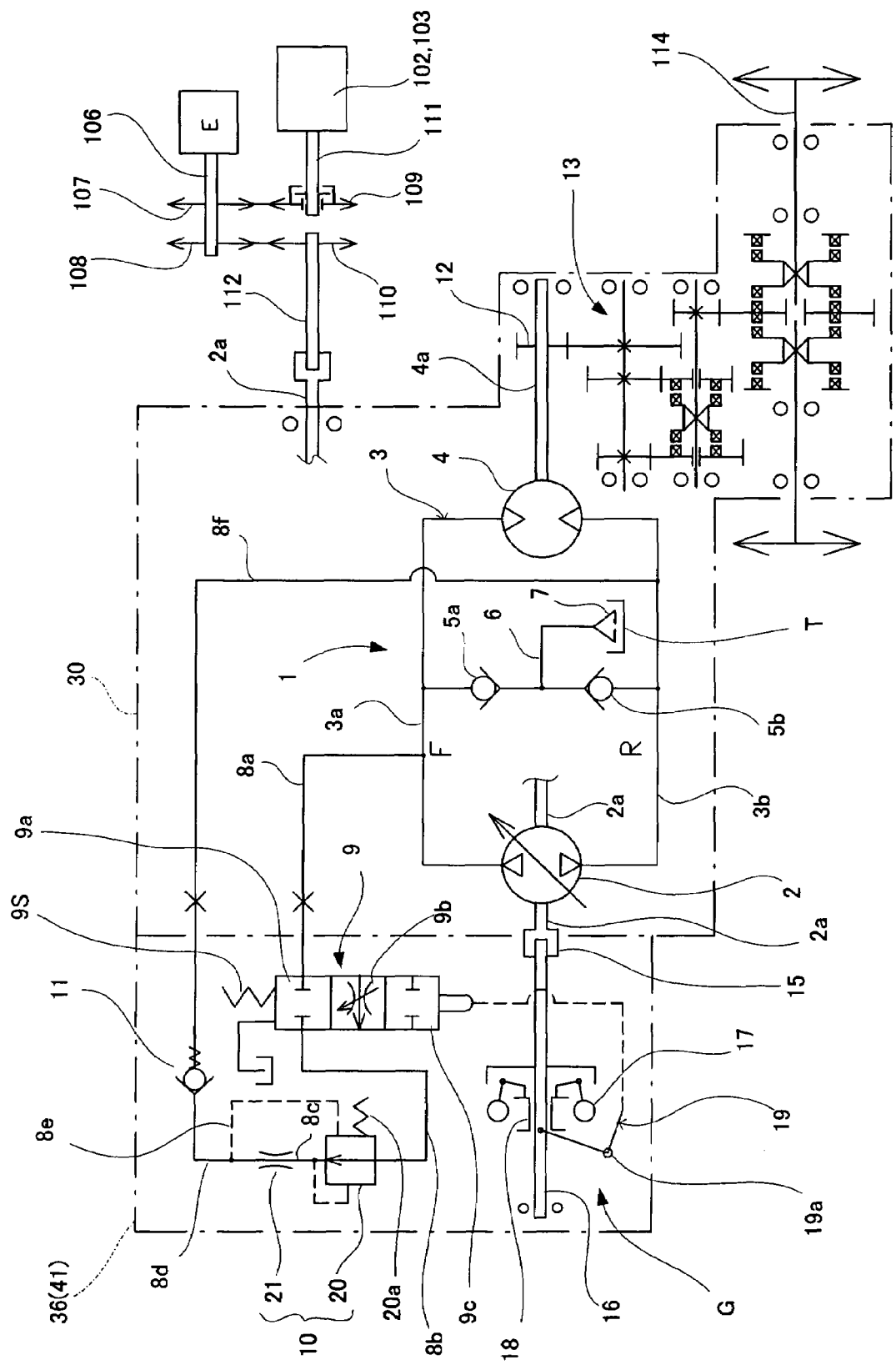
FIG. 1 shows an oil-hydraulic circuit illustrating a hydrostatic transmission equipped with a load controller of the first embodiment of the present invention.

A first embodiment of a load controller of the present invention is explained below. FIG. 1 shows an oil-hydraulic circuit of a hydrostatic transmission provided with a load controller. The hydrostatic transmission 1 comprises an oil-hydraulic pump 2 driven by an engine E, and an oil-hydraulic motor 4 (actuator) that is connected to the oil-hydraulic pump 2 via oil lines 3*a* and 3*b* that form an oil-hydraulic closed circuit 3.

In the example shown in the figure, the oil-hydraulic pump 2 is a variable-displacement oil-hydraulic pump, and the oil-hydraulic motor 4 is a fixed displacement motor. The oil line 3*a* has high pressure during forward movement, and the oil line 3*b* has low pressure during forward movement. The oil lines 3*a* and 3*b* meet at an oil supplement circuit 6 via check valves 5*a* and 5*b*. When either the oil line 3*a* or oil line 3*b* has negative pressure, oil can be supplied to the oil supplement circuit 6 from the oil tank T via a filter 7. This is an example of a self-priming pump; however, it is also possible to provide a charge pump that is driven together with the oil-hydraulic pump 2 to connect this discharge port to the oil supplement circuit 6. The oil line 3*a* and the oil line 3*b* are bypassed using a bypass oil line 8. The bypass oil line 8 is provided with a first opening/closing valve 9, a flow control valve 10, and a check valve 11.

An output shaft 4*a* of an oil-hydraulic motor 4 drives an axle 114 of a crawler through an output gear 12 and a spur-gear mechanism 13. An input shaft 2*a* of the oil-hydraulic pump 2 is connected to a drive shaft 112 of the engine E. The input shaft 2*a* is connected to a revolution number detection shaft 16 that rotates unitedly with the input shaft 2*a* via a joint 15. Output from the engine E is also transmitted to a PTO shaft 111 via a clutch.

A slider 18 or thrust bearing to which a flyweight 17 is connected is slidably fitted to the revolution number detection shaft 16. The slider 18 or thrust bearing transfers the information regarding positional change of the flyweight 17. A feedback arm 19 is rotatably attached to a pivot shaft 19*a*, wherein one end of the feedback arm 19 contacts the slider 18, and another end thereof contacts the first opening/closing valve 9.

Therefore, the flyweight 17, the slider 18, and the feedback arm 19 form a centrifugal governor G that serves as an opening/closing valve controller for opening or closing the first opening/closing valve 9. A load controller for controlling the load applied to the engine E comprises the centrifugal governor G, the bypass oil line 8, and the first opening/closing valve 9.

The first opening/closing valve 9 is a spring-return type 2-port 3-position directional control valve having the shape of an offset coil. In this embodiment, the first opening/closing valve 9 is formed as a spool type valve; however, it is also possible to form it as a rotary valve. In this case, the spring 9S may be a torsion spring. When the engine is halted, the first opening/closing valve 9 is offset at the normal position shown in FIG. 1 by the action of the spring 9S, and therefore the port is closed. A flow control valve 10 is connected to the valve-outlet side of the first opening/closing valve 9. The flow control valve 10 comprises a pressure compensation valve 20 and a fixed throttle 21 connected to the valve-outlet side of the pressure compensation valve 20.

A hydrostatic transmission having the above-explained structure controls the load applied to an engine in the following manner.

When the engine E starts, in accordance with the increase in the revolution number of the engine E, the center of gravity of the flyweight 17 fixed to the revolution number detection shaft 16 shifts in the centrifugal direction, and the resulting displacement is transmitted to the slider 18. In accordance with the displacement of the slider 18 in the shaft direction, the feedback arm 19 rotates, having the pivot shaft 19*a* as its center, and the first opening/closing valve 9 is shifted against the coil spring 9S. The first opening/closing valve 9 stays at a first close port 9*a* until the number of revolutions of the engine E detected reaches a predetermined level. When the number of revolutions of the engine E increases and the number of revolutions detected reaches the predetermined number, the position of the first opening/closing valve 9 switches to an open port 9*b*. When the number of revolutions of the engine further increases and the detected number of revolutions exceeds the predetermined range, the position of the first opening/closing valve 9 switches to a second close port 9*c*.

In this hydrostatic transmission 1, the PTO shaft 111 is driven using output from the engine when the first opening/closing valve 9 is positioned at the second close port 9*c*. When the vehicle provided with the hydrostatic transmission 1 is a snowplow, if an overload is applied for some reason to the auger 102 connected to the PTO shaft 111 while removing snow, the number of revolutions of the input shaft 2*a* decreases via the oil-hydraulic motor 4 and oil-hydraulic pump 2. When the revolutions of the input shaft 2*a* decrease to a predetermined number, the centrifugal governor G operates and the first opening/closing valve 9 switches to the open port 9*b*, so that high-pressure working oil is sent to the low-pressure oil line 3*b* from the high-pressure oil line 3*a* via the first opening/closing valve 9, the flow control valve 10 and check valve 11 in the bypass oil line 8. The axle 114 thereby slows down, because absorption torque (load torque) from the axle 114 is reduced, and the output shaft 106 can distribute the driving torque from the output shaft 106 to the PTO shaft 111 (auger, etc.) to the maximum extent. As described above, maximum torque is applied to the PTO shaft 111, and the amount of snow entering the auger is reduced due to the reduction in the number of revolutions or a halt of the axle 114. The blockage of snow in the auger that caused the overload is thus reduced and the overload to the PTO shaft 111 is resolved.

When the overload to the PTO shaft 111 is resolved, the number of revolutions of the output shaft 106 of the engine E returns to the original level. When the number of revolutions of the output shaft 106 returns to the original level, the centrifugal governor G is actuated to reclose the first opening/closing valve 9. As a result, the number of revolutions of the axle 114 returns to the original level, and the snowplow removes snow while traveling forward at the original speed.

The pressure compensation valve 20 detects the difference between the valve-inlet pressure and valve-outlet pressure in the fixed throttle 21, and when the pressure of the valve-inlet exceeds that of the valve-outlet by a certain amount, the flow rate into the fixed throttle 21 is reduced. Therefore, the pressure compensation valve 20 prevents the working oil in the high-pressure oil line 3*a* from rapidly flowing into the low-pressure oil line 3*b*, and the vehicle from suddenly halting.

In an oil-hydraulic circuit of the above-described load controller, the bypass oil line 8 is structured so as to send the working oil from the high-pressure oil line to the low-pressure oil line. It is also possible to form the bypass oil line so as to connect the oil line that has high pressure during forward movement to the oil tank T to send the working oil in the high-pressure oil line 3*a* to the oil tank. This is also true in the second to sixth embodiments described later.

Figure 2:
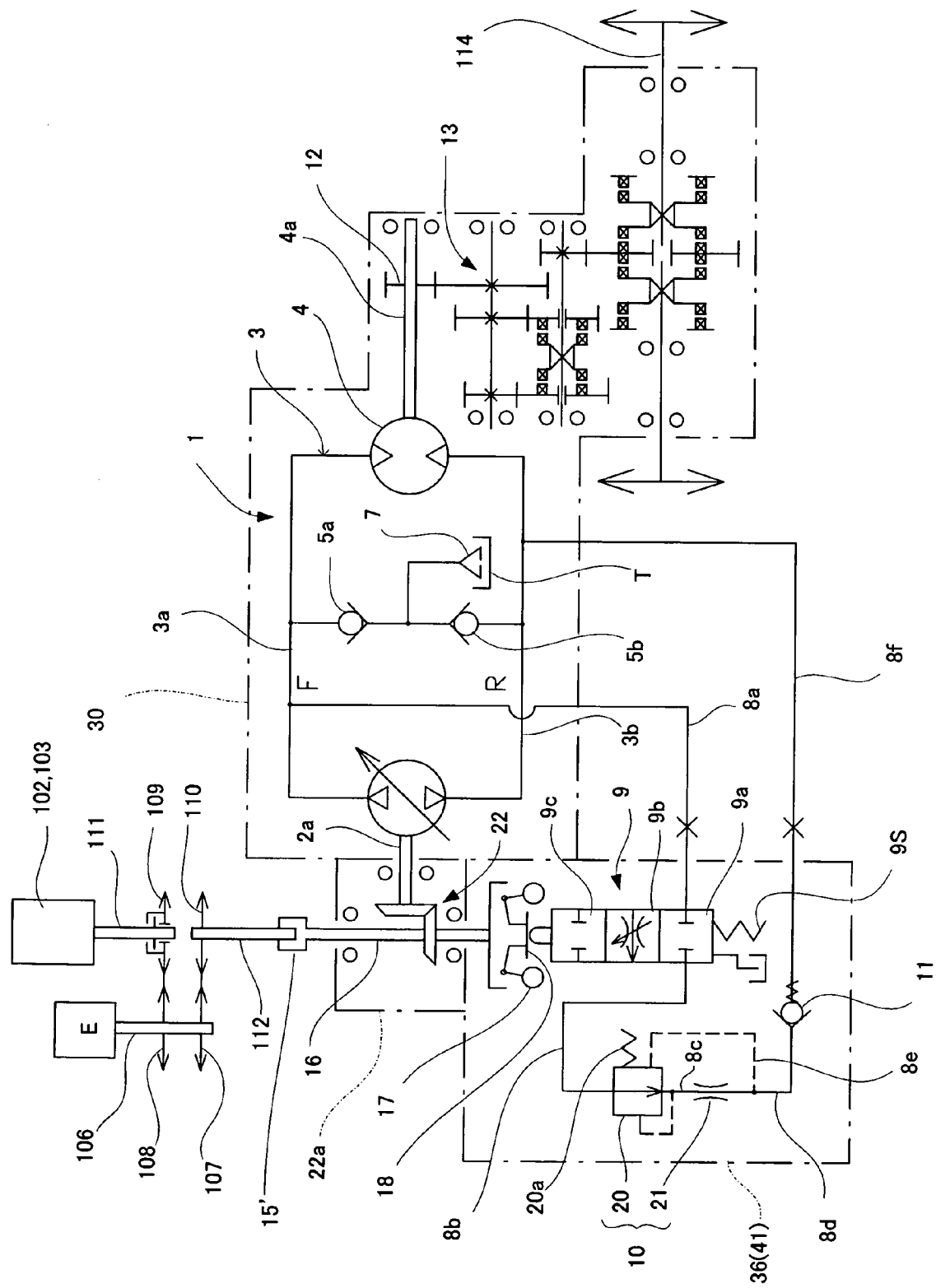
FIG. 2 shows an oil-hydraulic circuit illustrating a modification of the hydrostatic transmission of FIG. 1.

It is also possible to form a load controller so as to have the structure as shown in FIG. 2, wherein the first opening/closing valve 9 is disposed on the same shaft of the revolution number detection shaft 16 or in parallel to the revolution number detection shaft 16 so that the slider 18 provided on the revolution number detection shaft 16 directly controls the first opening/closing valve 9 without providing a feedback arm. In the example shown in FIG. 2, the revolution number detection shaft 16 is connected to the drive shaft 112 via a joint 15', and an input shaft 2*a* of the oil-hydraulic pump 2 is connected to the revolution number detection shaft 16 via a bevel gear 22.

Figure 3:
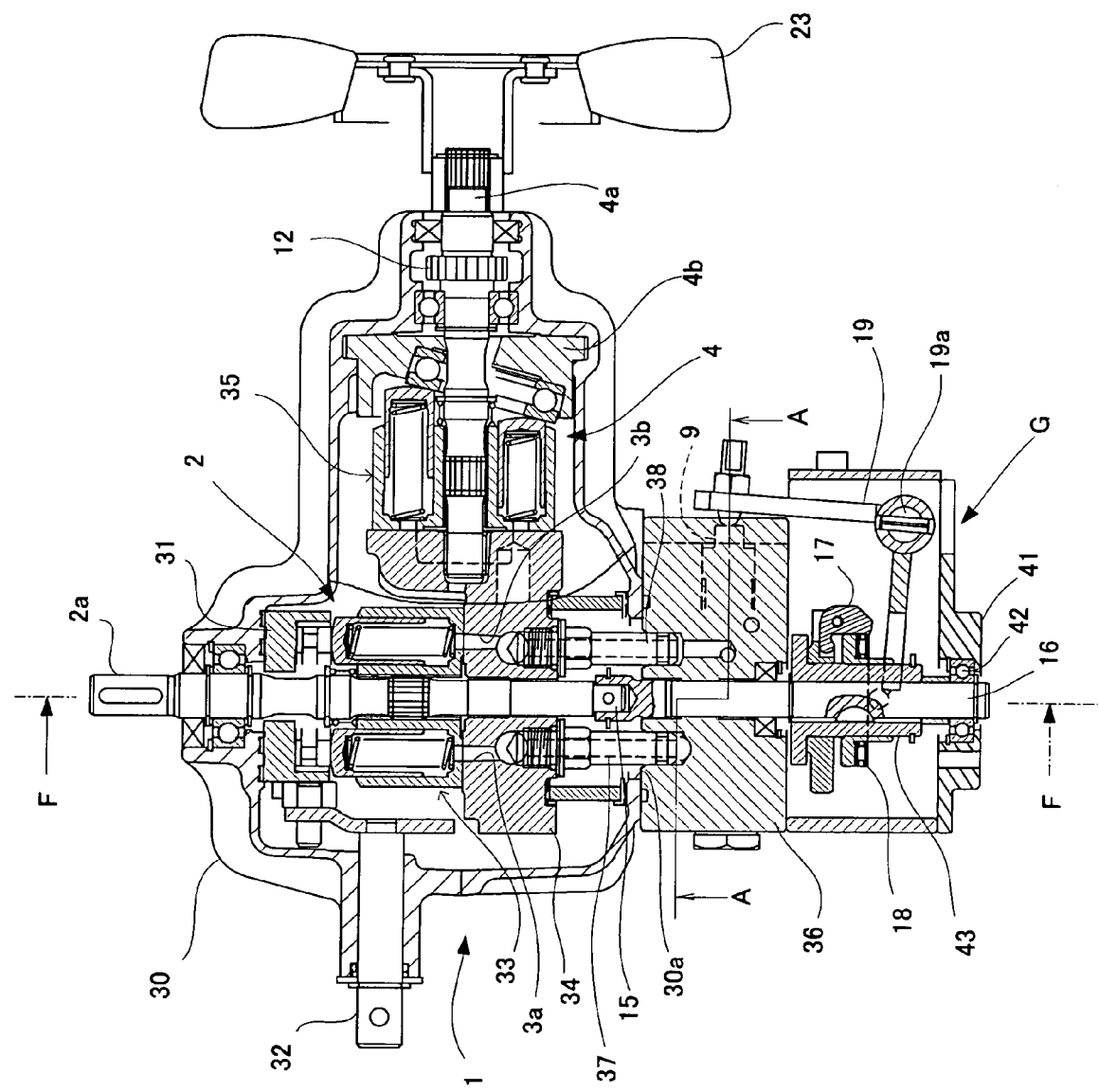
FIG. 3 is a cross-sectional view showing a hydrostatic transmission equipped with an oil-hydraulic circuit such as that shown in FIG. 1.
Figure 4:
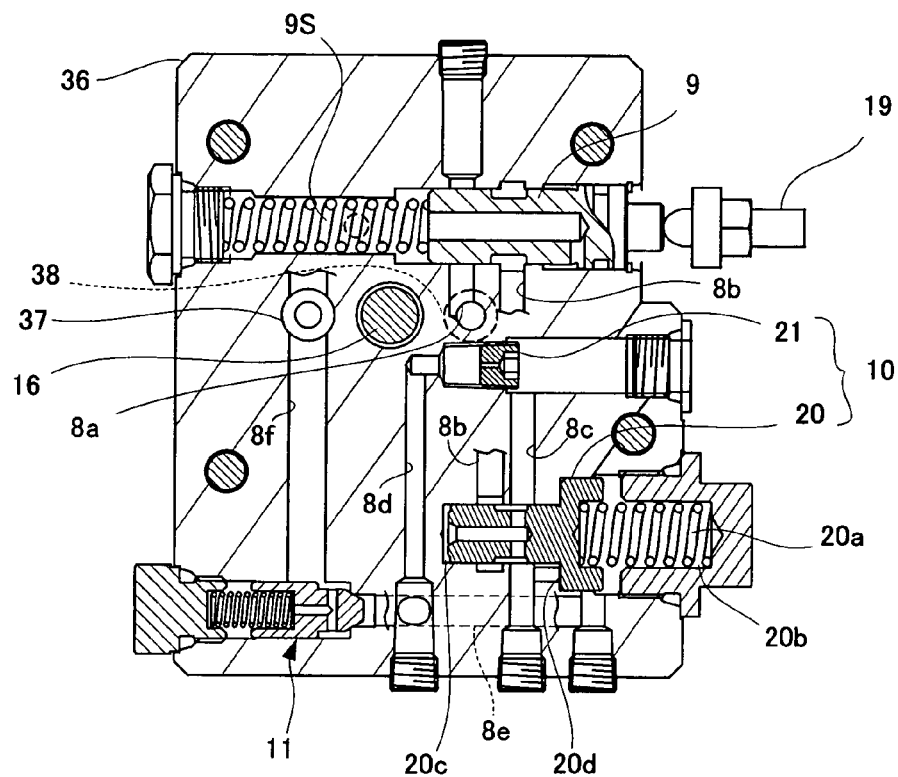
FIG. 4 is an enlarged vertical longitudinal sectional view taken along the line A-A of FIG. 1.

Second, a hydrostatic transmission provided with a load controller as shown in FIG. 1 is explained with reference to FIGS. 3 and 4. FIG. 3 is a cross-sectional view of a hydrostatic transmission mounted on a snowplow, and FIG. 4 is an expanded sectional view of FIG. 3 taken along the line A-A, which shows a longitudinal sectional view of the load controller. Note that some parts of the following explanation overlap with those of the oil-hydraulic circuit.

As shown in FIG. 3, the hydrostatic transmission 1 comprises an oil-hydraulic pump 2, oil-hydraulic motor 4, etc., housed in a housing 30. In the housing 30, an adjustable swash plate control shaft 32 for controlling an adjustable swash plate 31 of the oil-hydraulic pump 2 is provided in such a manner that the adjustable swash plate control shaft 32 protrudes outward. An engine (not shown) for driving the input shaft 2*a* is disposed outside the housing, and an air-cooling fan 23 is provided on an output shaft 4*a*. Power for driving a crawler (not shown) is output through an output gear 12 that engages with an oil-hydraulic motor 4. The control shaft 32 is connected to an adjustable swash plate control lever (see FIGS. 8 and 13) via an arm, a wire, or a rod.

The oil-hydraulic pump 2 comprises a group of cylinders 33 that rotate in accordance with the rotation of the input shaft 2*a*. From the group of cylinders 33, the working oil in an amount corresponding to the inclination of the adjustable swash plate 31 is sent to the group of cylinders 35 in the oil-hydraulic motor 4 via a high-pressure oil line 3*a* in a center section 34. The working oil is then sent back to the group of cylinders 33 in the oil-hydraulic pump 2 via a low-pressure oil line 3*b* in the center section 34 by driving the oil-hydraulic motor 4. Reference symbol 4*b* stands for a fixed swash plate in the oil-hydraulic motor.

Figure 8:
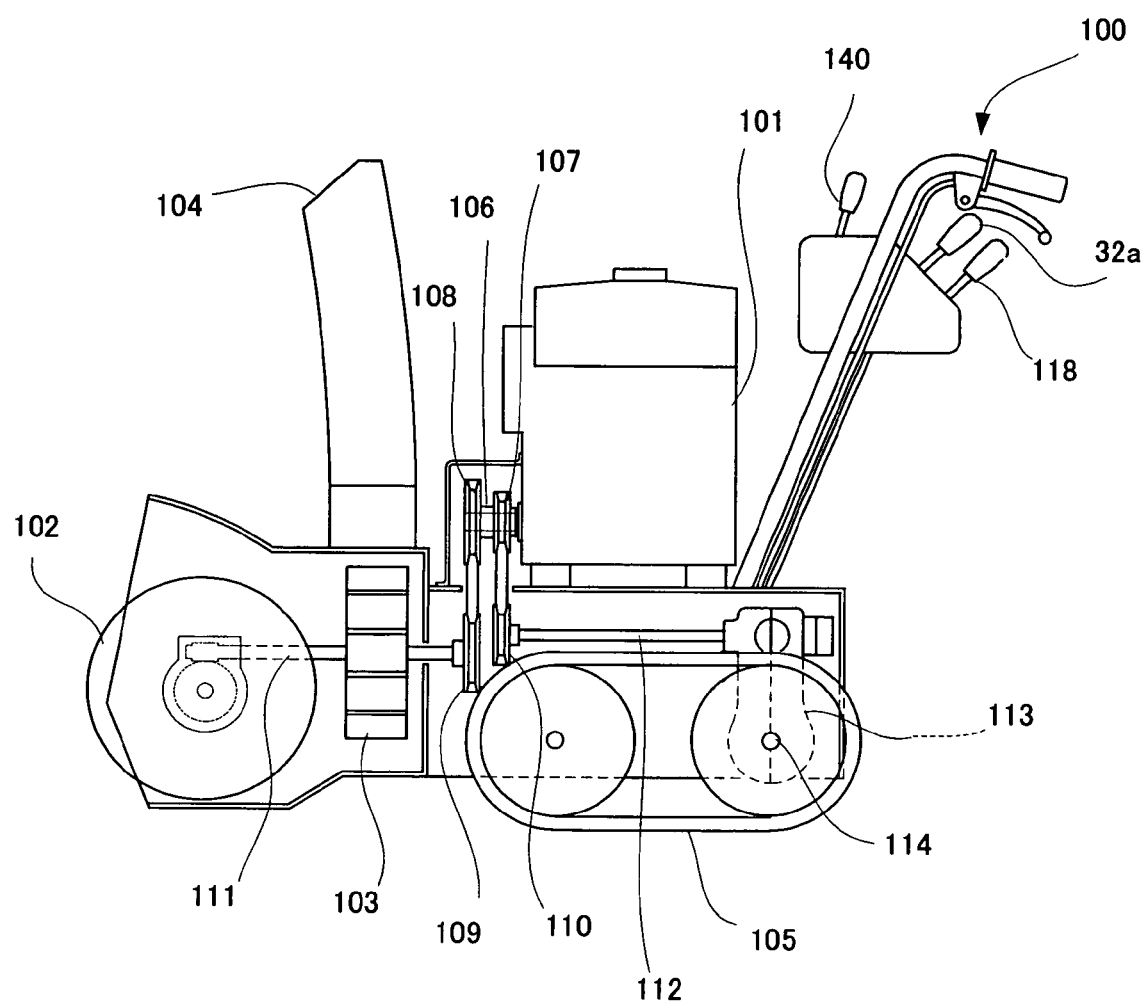
FIG. 8 is a side elevational view showing the overall structure of a snowplow.

The drive shaft 112 and the axle 114 of the engine E are disposed so as to cross at right angles to each other (see FIG. 8). Therefore, to turn the input shaft 2*a* of the oil-hydraulic pump 2 so it faces the direction of the drive shaft 112 of the engine E (see FIG. 1), and to turn the output shaft 4*a* of the oil-hydraulic motor 4 so it faces the direction of the axle 114, the center section 34 is structured so that the surface on which the oil-hydraulic pump 2 is installed (joint surface) and the surface on which the oil-hydraulic motor 4 is installed (joint surface) intersect at right angles to each other, and the oil-hydraulic pump 2 and the oil-hydraulic motor 4 are detachably mounted in the housing 30.

The housing 30 has an opening in the external surface thereof on the opposite side from which the input shaft 2*a* of the oil-hydraulic pump 2 projects. To close this opening 30*a*, a valve casing 36 integrally comprising a below-explained governor casing 41 is provided on the external wall surface of the housing 30 in an oiltight manner.

In contrast, in the hydrostatic transmission 1 shown in FIG. 2, the input shaft 2*a* of the oil-hydraulic pump 2 faces the axle 114 in the same way as the output shaft 4*a* of the oil-hydraulic motor 4. The drive shaft of the engine and the input shaft of the oil-hydraulic pump are disposed so as to intersect each other at right angles. In such an arrangement, to connect the input shaft 2a of the oil-hydraulic pump 2 to the drive shaft 112 of the engine E, a bevel gear 22 is used as described above. An input gear case 22a for housing the bevel gear is provided on the external surface of the housing 30, and the valve casing 36 is provided on the external surface of the input gear case 22a.

The valve casing 36 houses an opening/closing valve, flow control valve, etc. (See FIG. 4). Two tubes 37 and 38 that connect the valve casing 36 and the center section 34 via the opening 30a form a portion of bypass oil lines 8a and 8f that bypass oil lines 3a and 3b in the center section 34.

The valve casing 36 is provided with a centrifugal governor G. The revolution number detection shaft 16 is connected to the input shaft 2a of the oil-hydraulic pump 2 via the joint 15. The revolution number detection shaft 16 is disposed on the same axial line as the input shaft 2a, passes through the valve casing 36, and is supported between the valve casing and a bearing 42 disposed in the governor casing 41.

A sleeve 43 having a disc portion is adhered to the revolution number detection shaft 16. A plurality of flyweights 17 are attached on the disc portion side surface of the sleeve 43 in such a manner that the flyweights 17 can rotate in the circumferential direction, and a slider 18 is slidably attached to the external surface of the sleeve. In the governor casing 41, a feedback arm 19 is rotatably attached to a pivot shaft 19a supported in the perpendicular direction to the revolution number detection shaft 16. One end of the feedback arm 19 has a fork-like shape and contacts the slider 18, and the other end contacts the first opening/closing valve 9, forming an L-like shape as a whole.

As shown in FIG. 4, the valve casing 36 comprises the first opening/closing valve 9, the fixed throttle 21, the pressure compensation valve 20, and the check valve 11. The first opening/closing valve 9 is pressed toward the feedback arm 19 by the offsetting coil spring 9S that is disposed in perpendicular to the revolution number detection shaft 16.

The flow control valve is formed from the pressure compensation valve 20 and the fixed throttle 21. In the pressure compensation valve 20, the surface area of the chamber 20b that contacts the coil spring 20a is the same as the total surface area of the chambers 20c and 20d opposite to the chamber 20b. The chambers 20c and 20d open to a valve-inlet side oil line 8c in the fixed throttle 21. The chamber 20b opens to a valve-outlet side oil line 8d in the fixed throttle 21. The structure of the flow control valve 10 keeps the pressure drop in the fixed throttle 21 relatively fixed. By replacing the fixed throttle 21 with a variable throttle, it is possible to supply working oil in the amount proportion to the cross-sectional area of the variable throttle.

When the number of revolutions of the revolution number detection shaft 16 increases, the flyweight 17 opens and the flyweight 17 displaces the slider 18 along the revolution number detection shaft 16. In accordance with the displacement of the slider 18, the feedback arm 19 presses the first opening/closing valve 9 against the coil spring 9S. When the number of revolutions of the revolution number detection shaft 16 is within a predetermined range, the first opening/closing valve 9 is pressed by the feedback arm 19 and switches to the position of open port 9b (see FIG. 1). When the first opening/closing valve 9 opens, the working oil from the oil line 8a enters the oil line 8b via the first opening/closing valve 9, and passes through the pressure compensation valve 20 and the fixed throttle 21. The oil line is then branched into two, one passes through a check valve 11, and the other enters the chamber 20b at the coil spring 20a side of the pressure compensation valve 20 via an oil line 8e.

When the pressure difference of the oil line before and after the fixed throttle 21 is smaller than the pressure that corresponds to the energizing force of the coil spring 20, the working oil is allowed to flow from the oil line 8b to the oil line 8c, and when it is larger, the flow from the oil line 8b to the oil line 8c is limited. This prevents the high-pressure oil from rapidly flowing into the oil line 3b from the oil line 3a. This prevents a sudden halt of the work vehicle due to the operation of the first opening/closing valve 9 and allows smooth deceleration or acceleration to be achieved. When the number of revolutions of the engine further increases from that when the first opening/closing valve 9 is at an open port position, the first opening/closing valve 9 switches to the second close port 9c position.

The range of the number of revolutions at which the first opening/closing valve 9 switches its position can be suitably selected depending on the horsepower of the engine, the type of the work vehicle, etc. For example, when the work vehicle provided with the hydrostatic transmission 1 is a snowplow, assuming that the number of revolutions of the engine while driving the auger is 2000-3000 rpm, the first opening/closing valve 9 is at the first close port 9a and closed when the snowplow is traveling with the engine revolutions in the range of 0-1000 rpm. If the first opening/closing valve 9 is designed so as to open when the detected number of revolutions falls into the range of 1000-2000 rpm, it is possible to route the high-pressure oil from a high-pressure oil line to a low-pressure oil line in an oil-hydraulic closed circuit that composes a hydrostatic transmission, when the number of revolutions detected by the revolution number detection shaft 16 is reduced due to an overload applied to the auger while removing snow. This prevents the engine from halting.

Figure 5:
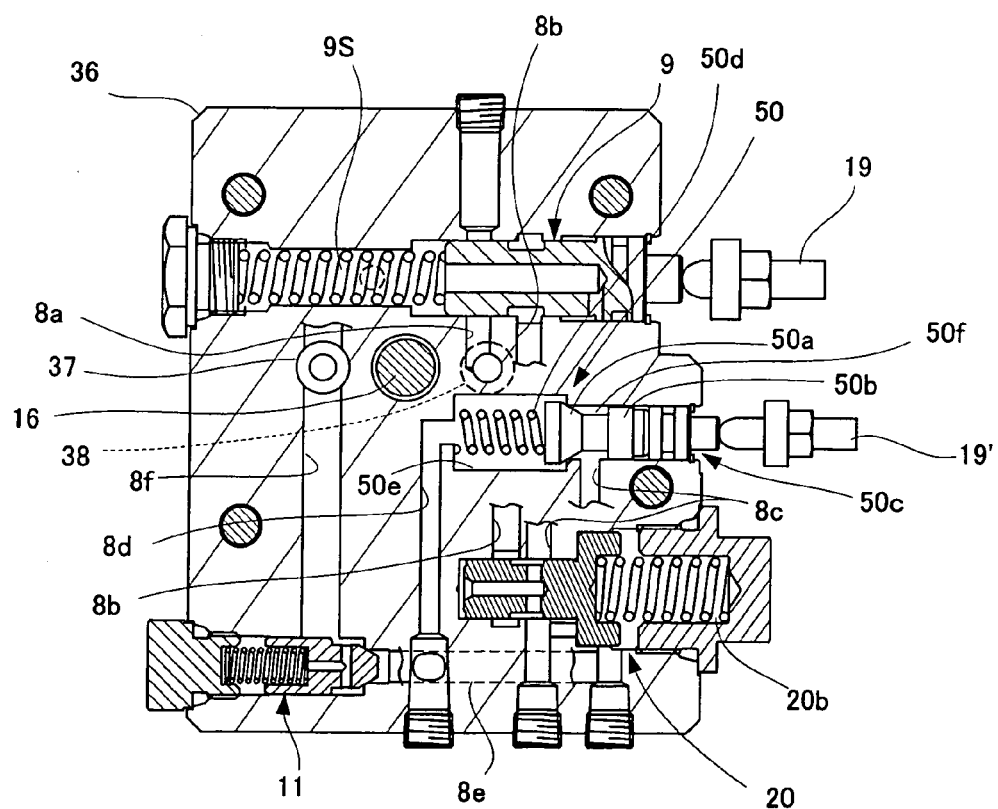
FIG. 5 is a longitudinal sectional view of a load controller according to the second embodiment of the present invention.

A second embodiment of a load controller of the present invention is explained below with reference to FIG. 5. The load controller shown in FIG. 5 is different from that of FIG. 4 in that the fixed throttle 21 is replaced with a variable throttle 50 connected to the centrifugal governor G. In other respects, the second embodiment has the same structure as that of the above-described first embodiment.

The variable throttle 50 comprises a valve body 50c having a first valve element 50a and a second valve element 50b, and a coil spring 50d that contacts the first valve element 50a. A second feedback arm 19' contacts the valve body 50c. An oil line 8d opens to a chamber 50e that houses a coil spring 50d, and an oil line 8c opens to a chamber 50f disposed opposite to the coil spring 50d relative to the first valve element 50a. A passageway between the chamber 50e and the chamber 50f is opened or closed by the first valve element 50a. The cross-sectional area of the oil line 8c is reduced by the second valve element 50b.

The second feedback arm 19' can be provided by fixing another arm to a pivot shaft (not shown, corresponding to the pivot shaft 19a in FIG. 3) to which a feedback arm 19 connecting to the first opening/closing valve 9 is attached. In this case, the second feedback arm 19' rotates integrally with the feedback arm 19.

The valve-inlet side of the variable throttle 50 is connected to the oil line 8c disposed on the valve-outlet side of a pressure compensation valve 20. The valve-outlet side of the variable throttle 50 is connected to the valve-inlet side of a check valve 11 via the chamber 50e that houses the coil spring 50d and the oil line 8d, and is also connected to a chamber 20b in a pressure compensation valve 20 via an oil line 8e.

The spring constant of the coil spring 50d can be designed so that the first valve element 50a is closed when the number of revolutions of the engine falls from the engine is halted (the condition shown in FIG. 5) to the condition in which the snowplow travels without removing snow (for example, 0-1000 rpm); that the second valve element 50*b* gradually throttles the oil line 8*c* using the balance between the coil spring 50*d* and the second feedback arm 19' due to the centrifugal governor G when the number of revolutions is in the range, for example, of 1000-2000 rpm, i.e., until the number of revolutions reaches the operation level (for example, 2000-3000 rpm); and that the oil line 8*c* is closed when the number of revolutions reaches the operation level.

When the first opening/closing valve 9 opens due to the overload applied to the auger, etc., during the operation of the work vehicle and the number of revolutions of the engine is reduced, and high-pressure working oil starts to rapidly flow into the low-pressure oil line of the oil-hydraulic closed circuit via the by-pass oil line 8, a spring with this kind of spring constant will allow the rapid flow to be prevented by the second valve element 50*b* gradually opening the oil line 8 in accordance with the reduction of the number of revolutions. Thus, smooth deceleration or acceleration can be achieved by limiting the flow rate of working oil in such a manner that its pressure falls into a predetermined range while passing through the pressure compensation valve 20 after the first opening/closing valve 9, and by increasing or decreasing the cross-sectional area in proportion to the number of revolutions of the engine by using the operation of the variable throttle 50.

Hereunder, a third embodiment of a load controller of the present invention is explained with reference to FIG. 6. The load controller of the third embodiment is the same as that of the second embodiment described above except that the pressure compensation valve 20 is not included in the load controller of the third embodiment.

Although slight fluctuations may occur when no pressure compensation valve 20 is provided, smooth deceleration or acceleration can be achieved because the rate of flow can be increased or decreased in proportion to the number of revolutions of the engine using the centrifugal governor G.

Figure 7:
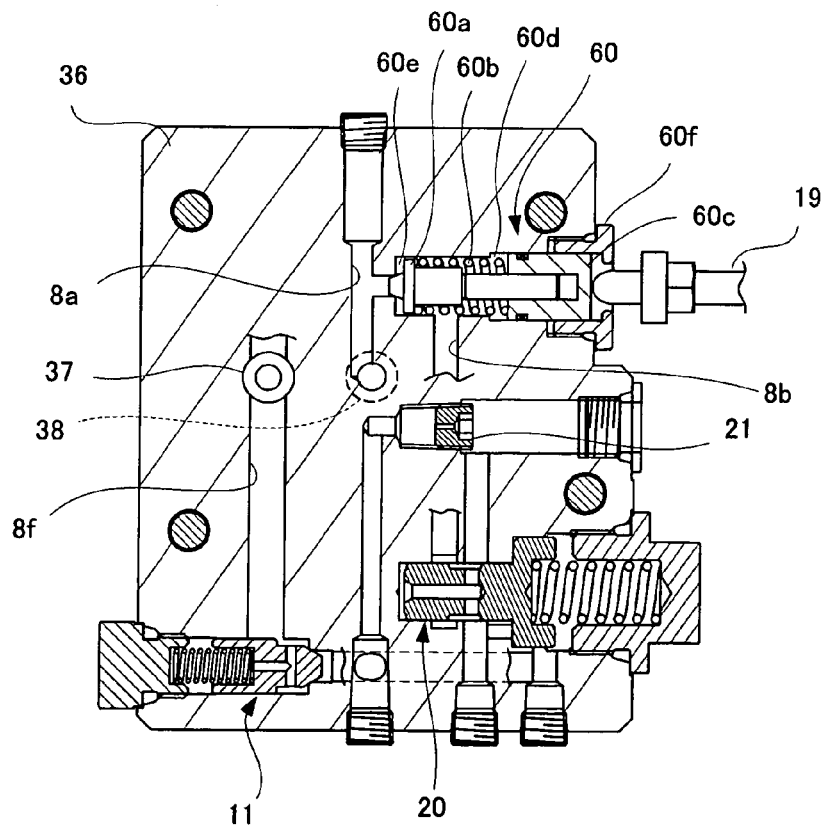
FIG. 7 is a longitudinal sectional view of a load controller according to the fourth embodiment of the present invention.

A fourth embodiment of a load controller of the present invention is explained below with reference to FIG. 7. The fourth embodiment uses a variable relief valve 60 instead of the 2-port 3-position directional control valve employed as the first opening/closing valve 9 in the first embodiment described above. The fourth embodiment is the same as the first embodiment in other respects.

The variable relief valve 60 comprises a valve body 60*a*, an offset coil spring 60*b*, and a spring receiver 60*c*. The coil spring 60*b* contacts the valve body 60*a* and the spring receiver 60*c*. A feedback arm 19 is connected to the spring receiver 60*c*. A chamber 60*d* housing the coil spring 60*b* opens to an oil line 8*b*, and a chamber 60*e* opposite to the coil spring 60*b* opens to an oil line 8*a*. The chamber 60*d* is sealed with an end cap 60*f* that is fixed by the spring receiver 60*c* and a valve casing 36. The end cap 60*f* has a hole in which the feedback arm 19 passes through. FIG. 7 shows the state in which the engine is stopped.

The spring constant of the coil spring 60*b* can be set so that the total of the pressing force by the feedback arm 19 in the centrifugal governor G and the energizing force of the coil spring 60*b* is almost equal to the working pressure in the oil-hydraulic closed circuit during the ordinary operation of the work vehicle. If a coil spring 60*a* with this kind of spring constant is provided, the variable relief valve 60 is closed as shown in FIG. 7 during ordinary operation, unless an overload is applied to the auger or other similar part. However, if the auger or other similar part becomes overloaded for some reason while the work vehicle is in operation and the number of revolutions of the engine is reduced, the pressing force of the feedback arm 19 is weakened and the spring receiver 60*f* retreats. In this condition, the energizing force of the spring 60*b* is weakened but the pressure of the working oil is increased. As a result, the variable relief valve 60 opens and the variable relief valve 60 can route high-pressure working oil from a high-pressure oil line 3*a* to a low-pressure oil line 3*b* in an oil-hydraulic closed circuit 3 via a by-pass oil line 8. The operation of the flow control valve 10 is the same as that of the first embodiment described above.

In the flow control valve 10 of the fourth embodiment, it is also possible to use the variable throttle used in the second embodiment described above instead of a fixed throttle 21. In this case, it is also possible to use a flow control valve 10 comprising only a variable throttle and without a pressure compensation valve 20 as described in the third embodiment, and alternatively, the variable throttle may be replaced with a fixed throttle.

A fifth embodiment of the load controller for a hydrostatic transmission mounted on a work vehicle of the present invention is explained below with reference to FIGS. 9 to 12.

Figure 9:
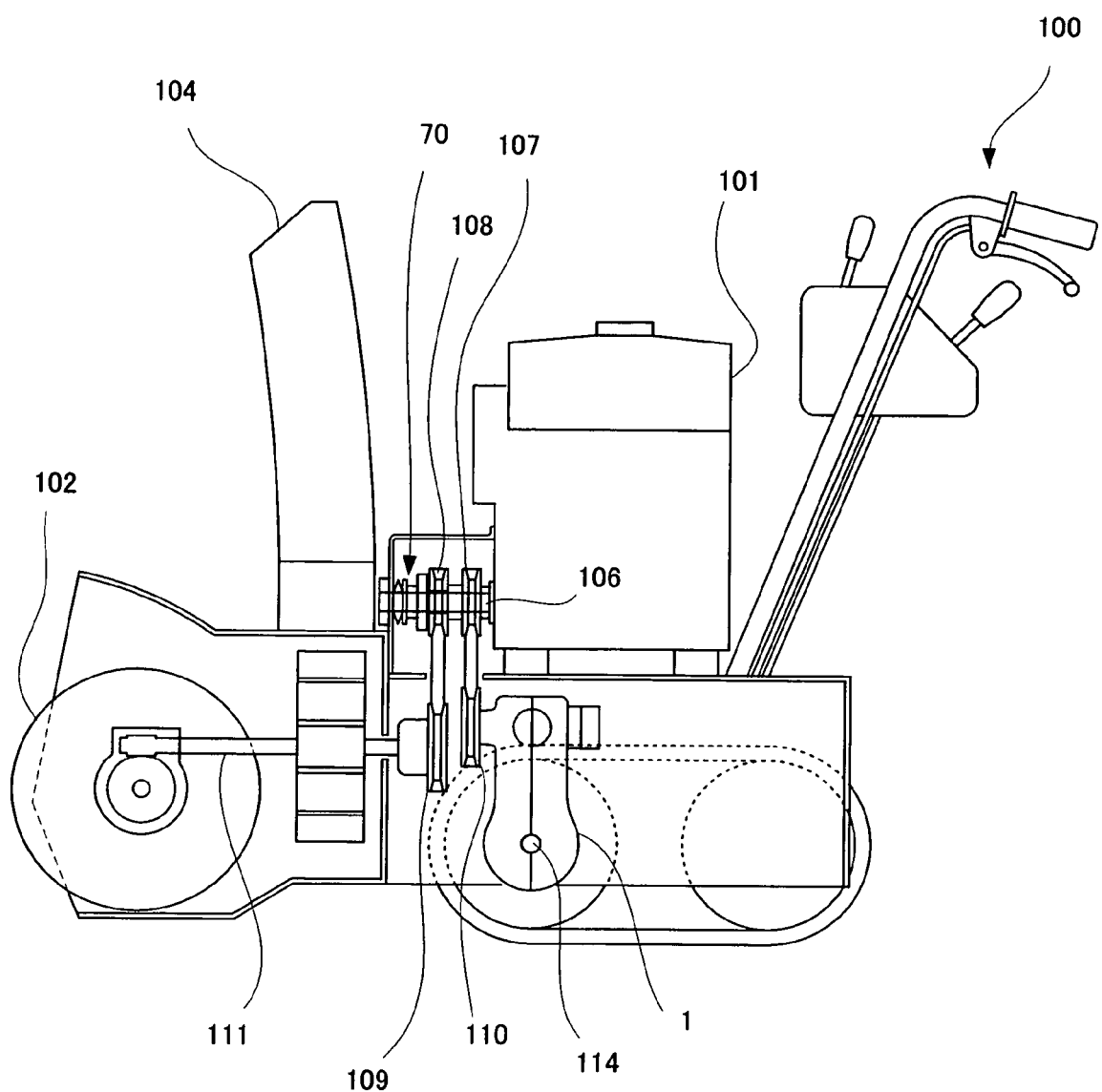
FIG. 9 is a side elevational view showing the overall structure of a snowplow comprising a load controller of the fifth embodiment of the present invention.
Figure 10:
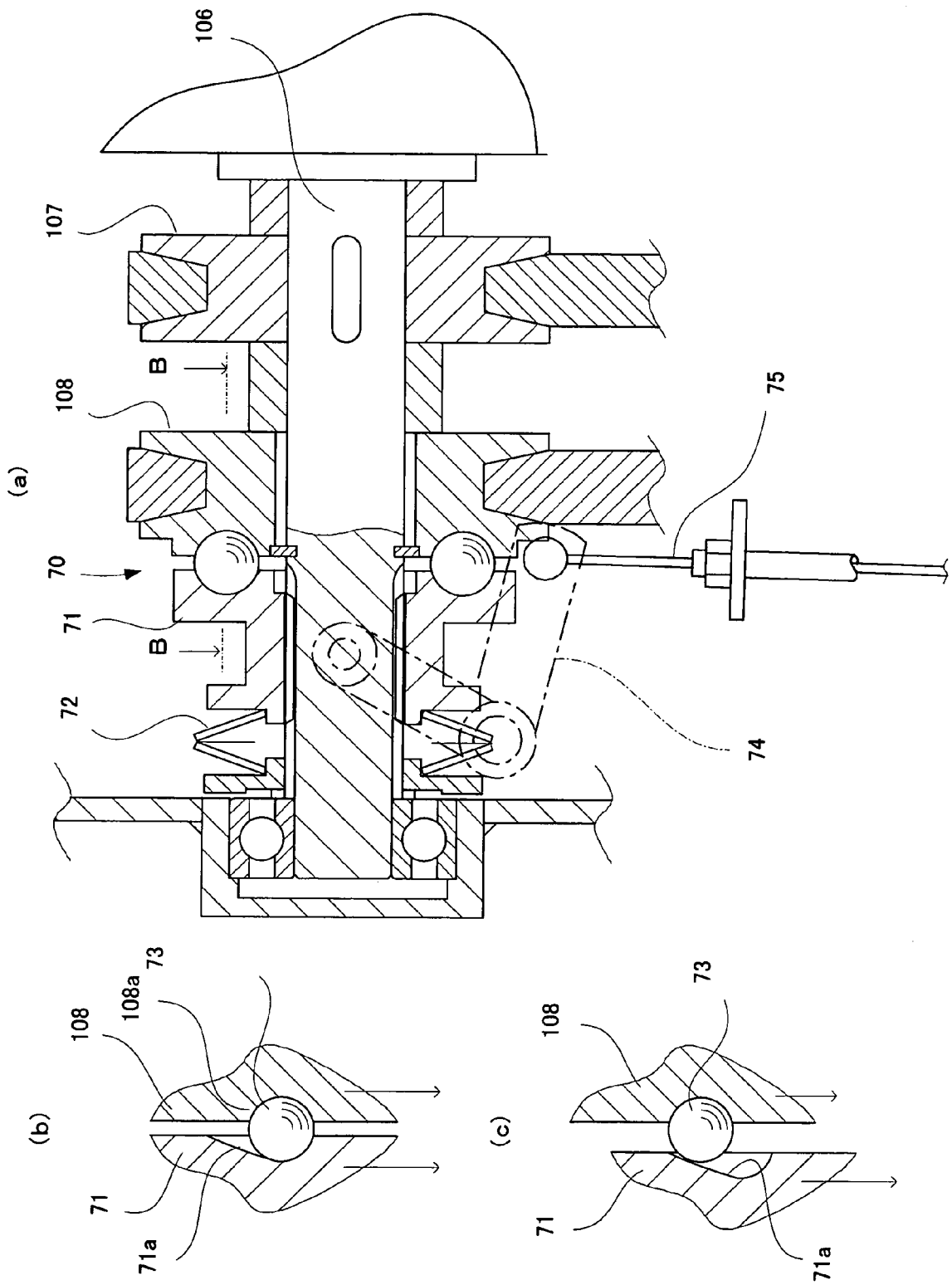
FIG. 10(*a*) is a partially enlarged cross-sectional view showing the opening/closing valve controller of FIG. 9, FIG. 10(*b*) is an enlarged vertical longitudinal sectional view taken along the line B-B of FIG. 10(*a*), and FIG. 10(*c*) is an enlarged vertical longitudinal sectional view illustrating the operating condition of the opening/closing valve controller of FIG. 10(*b*).
Figure 11:
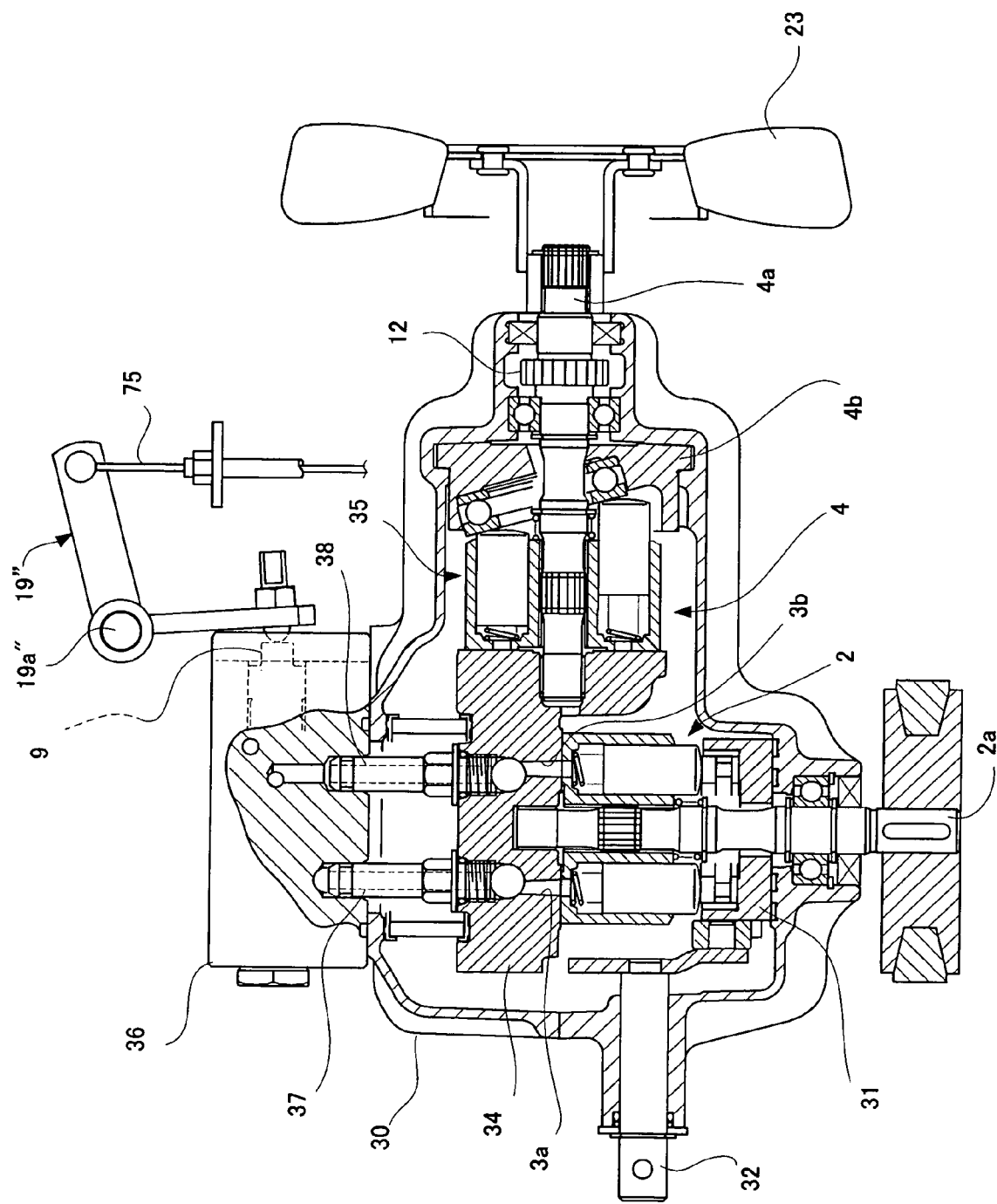
FIG. 11 is a cross-sectional view of the hydrostatic transmission of FIG. 9.
Figure 12:
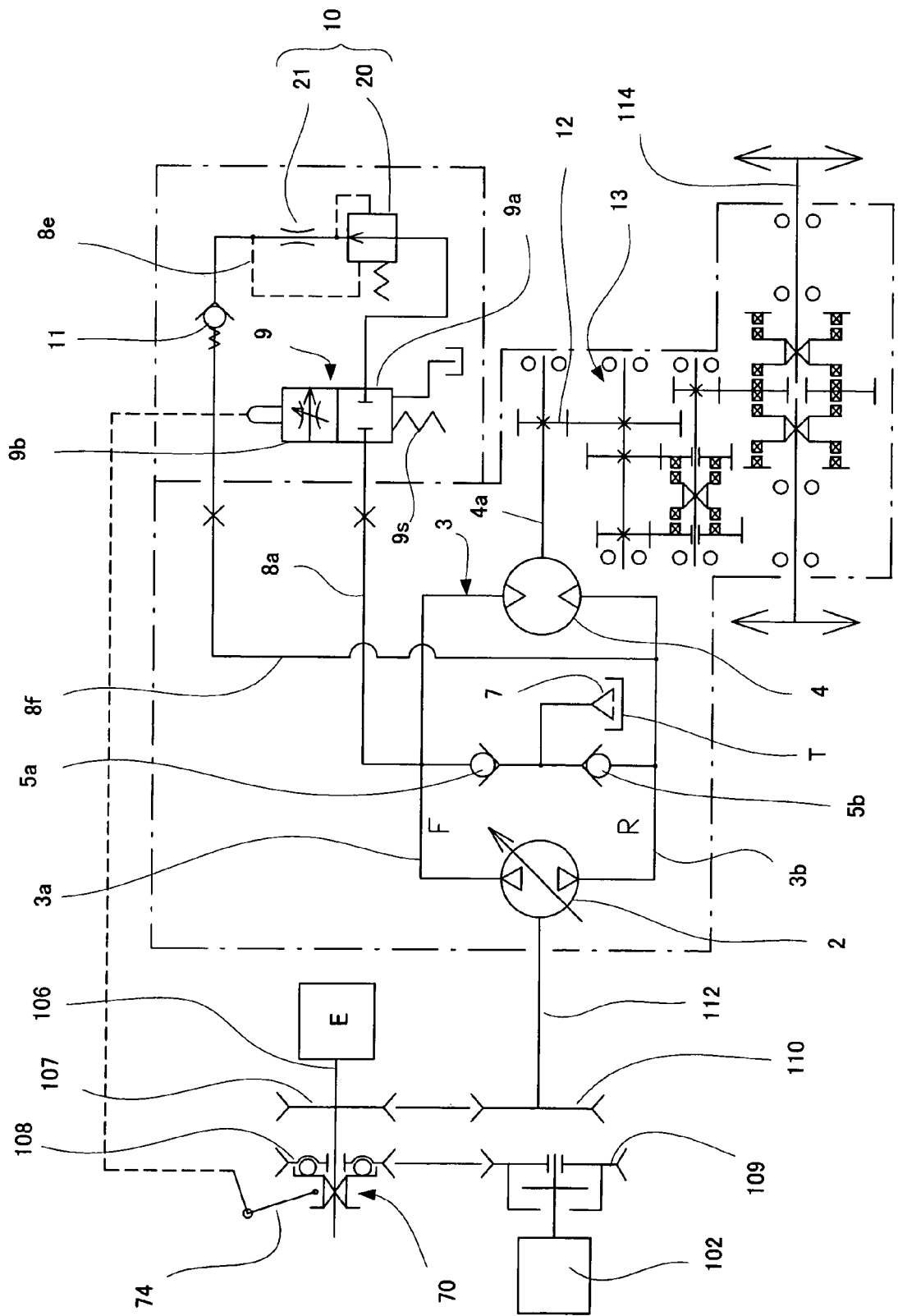
FIG. 12 is a diagram showing an oil-hydraulic circuit of the hydrostatic transmission of FIG. 9.

The load controller for a hydrostatic transmission mounted on a work vehicle of the fifth embodiment uses a torque sensing governor as an opening/closing valve controller. FIG. 9 is a side elevational view showing the entire structure of the snowplow. FIG. 10 is a partially enlarged cross-sectional view of the opening/closing valve controller. FIG. 11 is a cross-sectional view illustrating the hydrostatic transmission, and FIG. 12 is an oil-hydraulic circuit diagram.

As shown in FIG. 9, the snowplow functions as a work vehicle comprising a controller 100, an engine chamber 101, an auger 102, blower 103, a duct 104, and a crawler 105. Output from an output shaft 106 is branched into a PTO shaft 111 (implement system) for driving the auger 102 via pulleys 108 to 110 and a traveling system driven by a crawler 105 via a hydrostatic transmission 1.

A load torque detection unit 70 for detecting the load torque of the output shaft is provided on the output shaft 106. The load torque detection unit 70 is explained below.

As shown in FIG. 10, the output shaft 106 is provided with the PTO-driving pulley 108, which is rotatable relative to the output shaft, an HST-driving pulley 107 that is connected to the output shaft 106 in such a manner that the pulley 107 cannot rotate relative to the output shaft 106, a slider 71 attached to the output shaft 106 by a spline fit, and a coned disc spring 72 that presses the slider 71 towards the PTO-driving pulley 108. A ball pocket 71*a*, which has a slanted concave shape (see FIG. 10(*b*)), is formed in the slider 71, and a hemispherical ball pocket 108*a* is provided on the PTO-driving pulley 108. A ball 73 is fit into these ball pockets 71*a* and 108*a*. The ball pocket 71*a* is inclined so that it gradually becomes shallower along one circumferential direction from the deepest portion.

When no overload is applied to the PTO shaft 111, as shown in FIG. 10(*b*), the ball 73 is located at the deepest portion of the ball pocket 71*a*, and the slider 71 and the PTO-driving pulley 108 integrally rotate in the direction shown by the arrows in FIG. 10(*b*).

When the PTO shaft 111 becomes overloaded and the load torque of the PTO-driving pulley 108 exceeds the elastic force of the coned disc spring 72, a difference is generated between the relative rotation of the pulleys 108 and that of the output shaft 106, so that the ball 73 moves on the inclined plane of the ball pocket 73*a* towards the shallower portion thereof and the slider 71 is transferred in the direction away from the PTO-driving pulley 108. The load torque applied to the PTO-driving pulley 108 due to overload is thereby detected by being converted into a shift of the slider 71 along the output shaft 106.

The load torque that is detected by a load torque detection unit 70 with torque detection function is transferred to a wire 75 via a sliding member 74 connected to the slider 71. As shown in FIG. 11, the wire 75 opens or closes the first opening/closing valve 9 by sliding an L-shaped feedback arm 19″ that is pivoted on a machine casing (not shown) around a pivot shaft 19a‴.

When a load torque due to the overload of the PTO-driving pulley 108 is detected, the first opening/closing valve 9 of a valve casing 36 is pressed via the sliding member 74, wire 75, and feedback arm 19″, and the first opening/closing valve 9 is opened. The internal structure of the valve casing 36 is the same as that shown in FIG. 4, and therefore an explanation with reference to drawings is omitted here. Note that a 2-position directional control valve is employed as the first opening/closing valve 9 in this embodiment, as shown in FIG. 12. As described above, a torque sensing governor opens the first opening/closing valve 9 in accordance with the increase in the load torque that is applied to the output shaft 106 and that is detected by a load torque detection unit 70 with torque detection function.

The range of the load torque in which the torque sensing governor is actuated can be suitably selected depending on the type, size, etc., of the engine, and determined by the spring constant of the coned disc spring 72. The first opening/closing valve 9 must open at least before the engine stops. The load controller of the fifth embodiment can also be applied to the load controllers of the second to fourth embodiments.

A load controller for a hydrostatic transmission mounted on a work vehicle of the sixth embodiment of the present invention is explained with reference to FIGS. 13 to 18. Note that the sixth embodiment exemplifies a case wherein a centrifugal governor similar to that used in the first embodiment is employed; however, it is also possible to use the torque sensing governor that is employed in the fifth embodiment.

Figure 13:
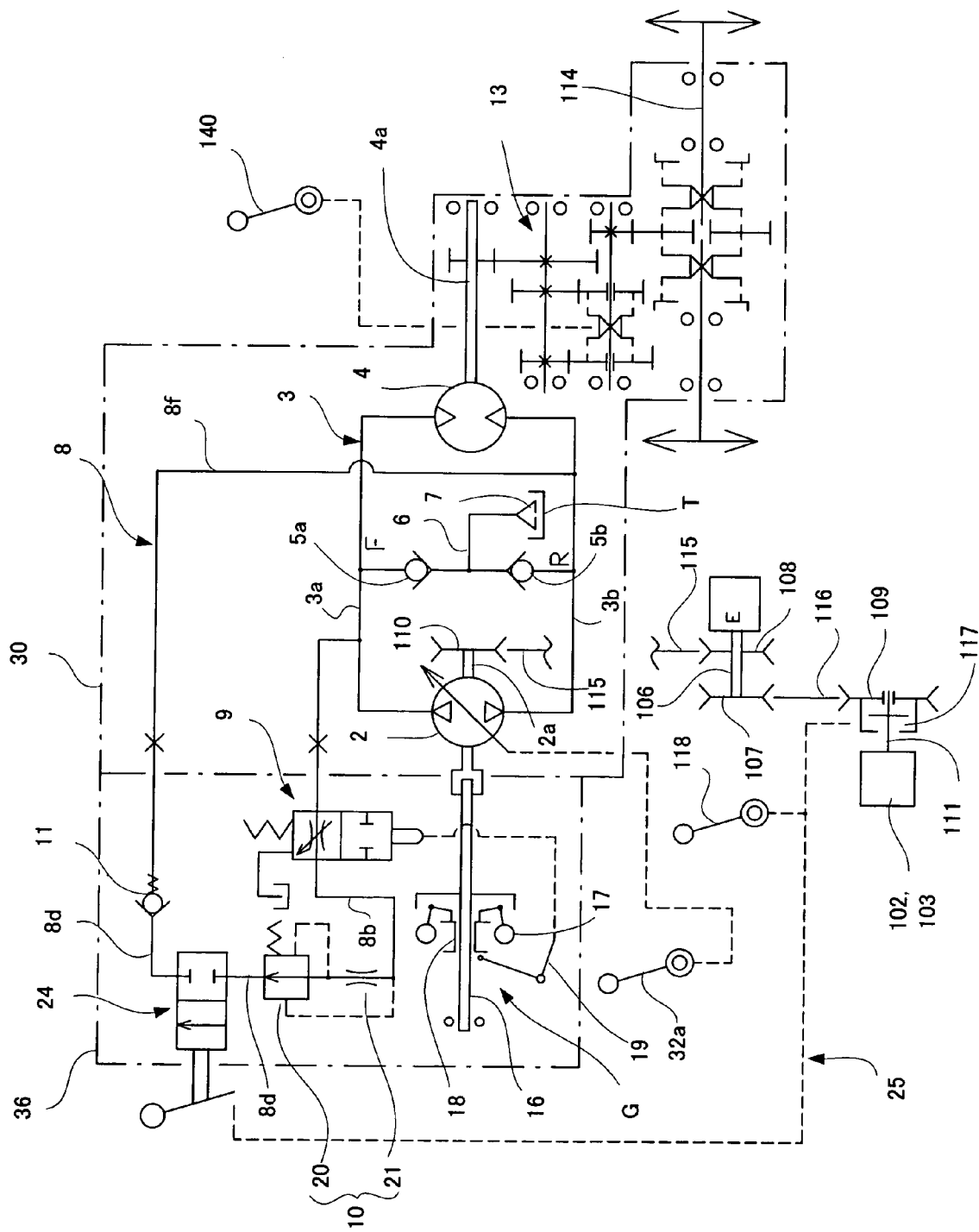
FIG. 13 is a diagram showing an oil-hydraulic circuit of a load controller according to the sixth embodiment of the present invention.

FIG. 13 is a diagram showing an oil-hydraulic circuit of a hydrostatic transmission provided with a load controller of the sixth embodiment of the present invention. The hydrostatic transmission 1 comprises an oil-hydraulic pump 2 driven by an engine E, and an oil-hydraulic motor 4 (actuator) connected to an oil-hydraulic pump 2 via oil lines 3a and 3b which form an oil-hydraulic closed circuit 3. Note that an oil tank, a charge pump supplying oil from the oil tank, etc., are not shown in FIG. 13.

In this figure, the oil-hydraulic pump 2 is a variable-displacement oil-hydraulic pump, and the oil-hydraulic motor 4 is a fixed displacement motor. The oil line 3a has high pressure during forward movement, and the oil line 3b has low pressure during forward movement. The oil lines 3a and 3b meet at an oil supplement circuit 6 via check valves 5a and 5b. When either the oil line 3a or oil line 3b has negative pressure, oil can be supplied to the oil supplement circuit 6 from the oil tank T via a filter 7. The oil line 3a and the oil line 3b are bypassed using a bypass oil line 8. The bypass oil line 8 is provided with a first opening/closing valve 9, a flow control valve 10, and a check valve 11.

The output shaft 4a of the oil-hydraulic motor 4 drives an axle 114 of a crawler via an output gear 12 and a spur-gear mechanism 13. One end of the input shaft 2a of the oil-hydraulic pump 2 is connected by a drive shaft 112 of the engine E via a tension belt 115. The other end of the input shaft 2a is connected to a revolution number detection shaft 16 that rotates integrally with an input shaft 2a via a joint 15. The output from the engine E is also transmitted to a PTO shaft 111 via the tension belt 116 and a clutch for an implement 117.

Figure 14:
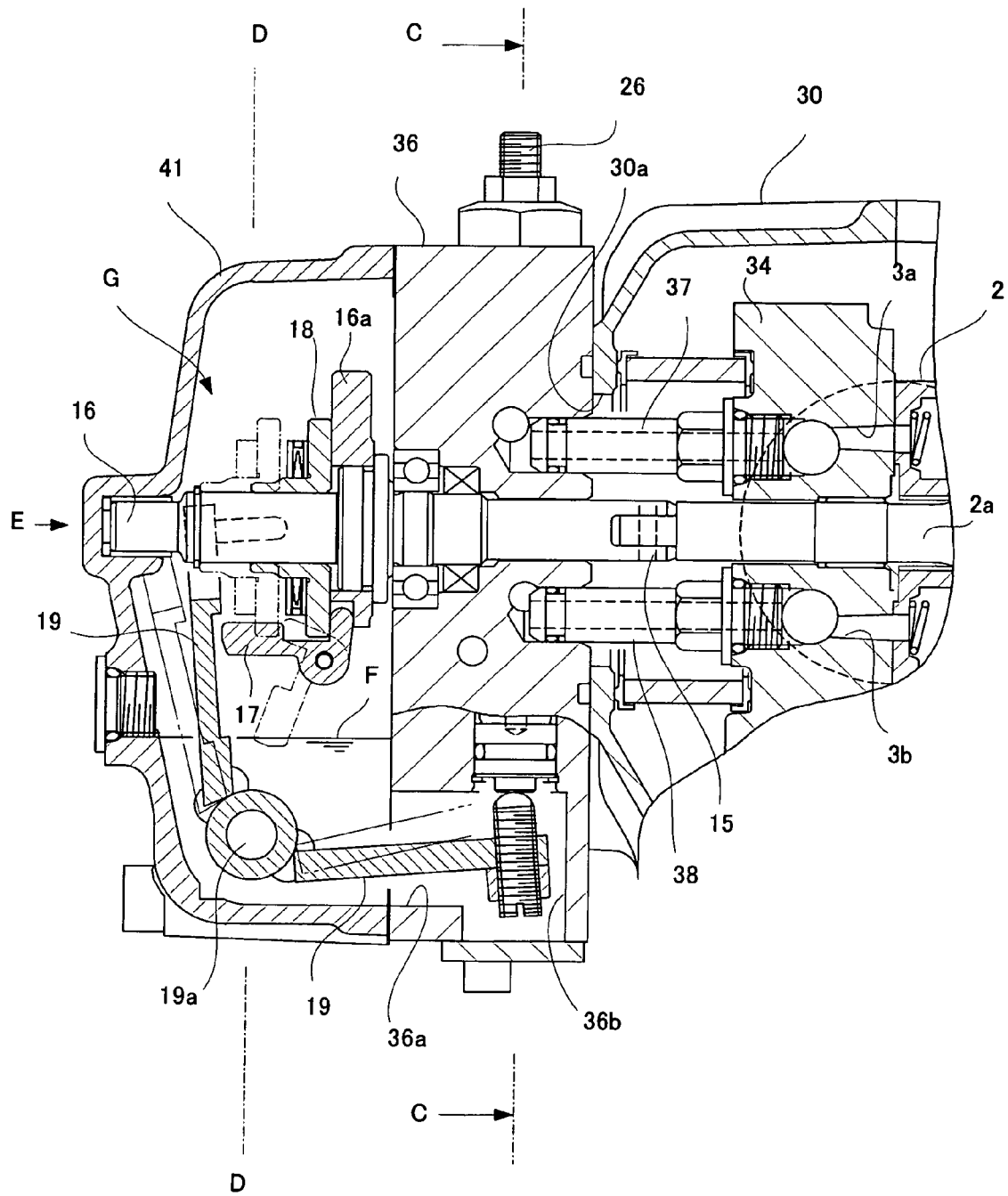
FIG. 14 is a partially omitted longitudinal front view showing a load controller according to the sixth embodiment of the present invention.

As shown in FIG. 14 in detail, a revolution number detection shaft 16 that is supported by bearings between a valve casing 36 and a governor casing 41 comprises a plurality of slidable flyweights 17, a disc portion 16a that is pivoted in the circumferential direction, and a slider 18 that is disposed adjacent to the disc portion 16a and that is attached to the revolution number detection shaft 16 so as to be slidable in the axial direction. The slider 18 transfers the displacement of the flyweight 17 to the feedback arm 19.

In the governor casing 41, a feedback arm 19 is rotatably attached to a pivot shaft 19a supported in the perpendicular direction to the revolution number detection shaft 16. One end of the feedback arm 19 has a fork-like shape and contacts the slider 18, and the other end enters an opening 36a formed in the valve casing 36 and contacts the bottom end of the first opening/closing valve 9 which faces the opening 36a. The opening 36a opens to a pit 36b, which is disposed below the bottommost first opening/closing valve 9, and this arrangement makes it possible for the sliding action of the other end of the feedback arm 19 to be allowed inside the valve casing 36 in accordance with the displacement of the slider 18.

A second opening/closing valve 24 that can open or close the by-pass oil line 8 by an external operation is provided on the valve-outlet side of the first opening/closing valve 9. The second opening/closing valve 24 is provided to switch the load controller of the engine ON and OFF. The second opening/closing valve 24 is structured so as not to be interlocked with a centrifugal governor G but can be voluntarily and manually switched using a control lever (not shown) provided in an operational panel.

Ordinarily, when the load is controlled, the operating condition is activated, i.e., the implement is driven, and therefore a clutch lever for an implement 118 that operates a clutch for an implement 117 can be coupled by a clutch interlocking system for an implement 25. The clutch interlocking system for an implement 25 is structured so that the second opening/closing valve 24 is closed at the OFF position of the clutch for an implement 117 and the second opening/closing valve 24 is opened at the ON position of the clutch for an implement. The details of the clutch interlocking system for an implement 25 are described later.

Ordinarily, when the load is controlled, the work vehicle is traveling at a working speed, and therefore it is also possible to interlock the second opening/closing valve 24 with an adjustable swash plate control lever 32a or gearshift 140 using an adjustable swash plate interlocking system or a gearshift interlocking system. These interlocking systems are structured so as to close the second opening/closing valve 24 when the adjustable swash plate control lever 32a or the gearshift 140 is at a non-working speed position, and to open the second opening/closing valve 24 when the adjustable swash plate control lever 32a or the gearshift 140 is at a working speed position. The adjustable swash plate interlocking system and the gearshift interlocking system are described later in detail.

The first opening/closing valve 9 is a spring-return type 2-port 2-position directional control valve comprising a spring 9S having the shape of an offset coil. The first opening/closing valve 9 comprises a variable throttle and can control the rate of flow of the working oil passing therethrough. When the engine is stopped, the first opening/closing valve 9 is at the position shown in FIG. 13, wherein the degree of throttle opening is the greatest. A flow control valve 10 is connected to the valve-outlet side of the first opening/closing valve 9. The flow control valve 10 comprises a pressure compensation valve 20 and a fixed throttle 21 connected to the valve-inlet side of the flow control valve 10.

Among the above-described constituent components, the flyweight 17, the slider 18, and the feedback arm 19 form the centrifugal governor G, which comprises an opening/closing valve controller that opens or closes the first opening/closing valve 9. The centrifugal governor G, the by-pass oil line 8, and the first opening/closing valve 9 comprise the load controller for controlling the load applied to the engine E. The second opening/closing valve 24 and the clutch interlocking system for an implement 25 perform the function of manually turning on or off the load controller in response to the operation/non-operation status of the implement.

Figure 15:
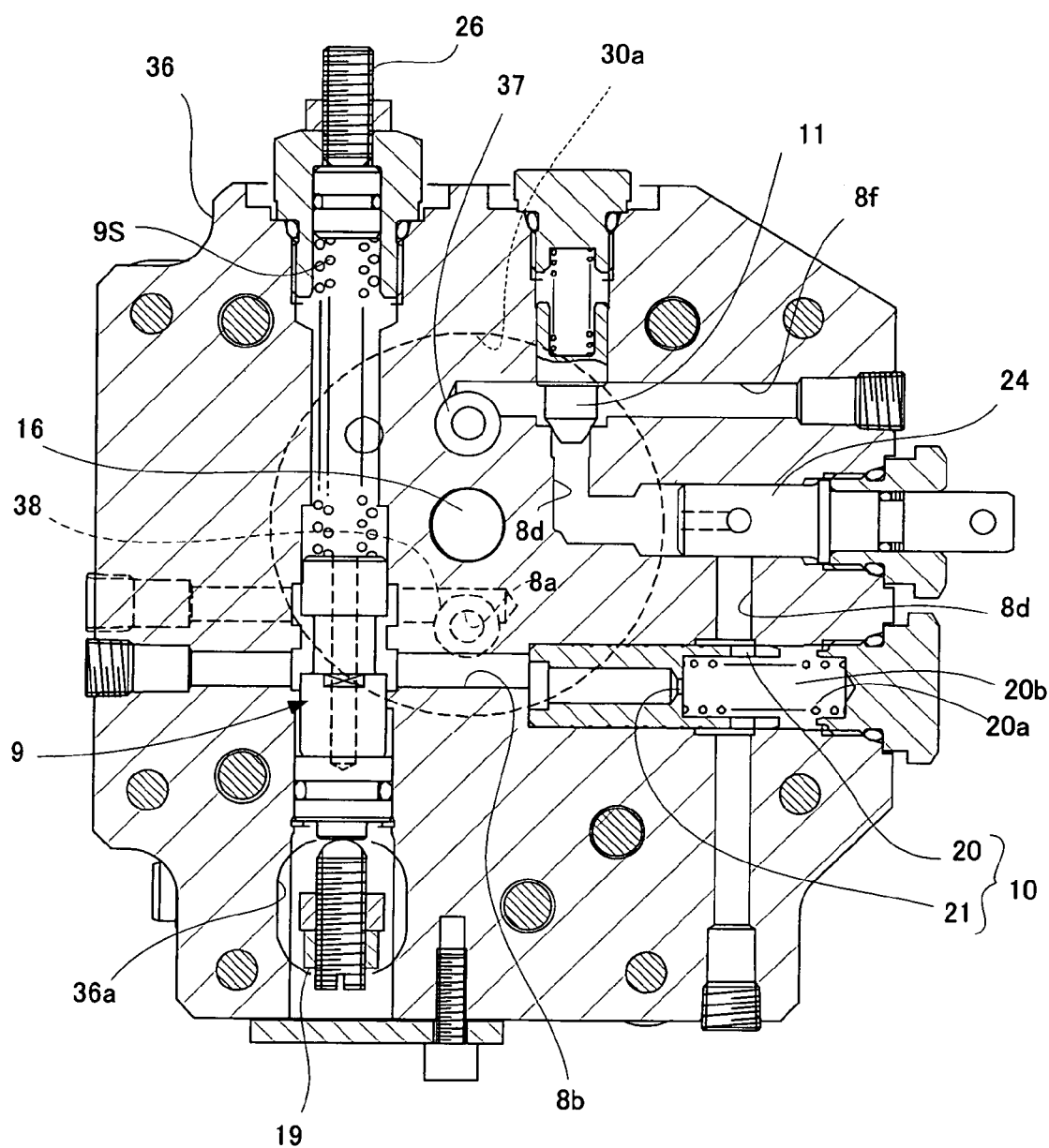
FIG. 15 is a side elevational view taken along the line C-C of FIG. 14.
Figure 16:
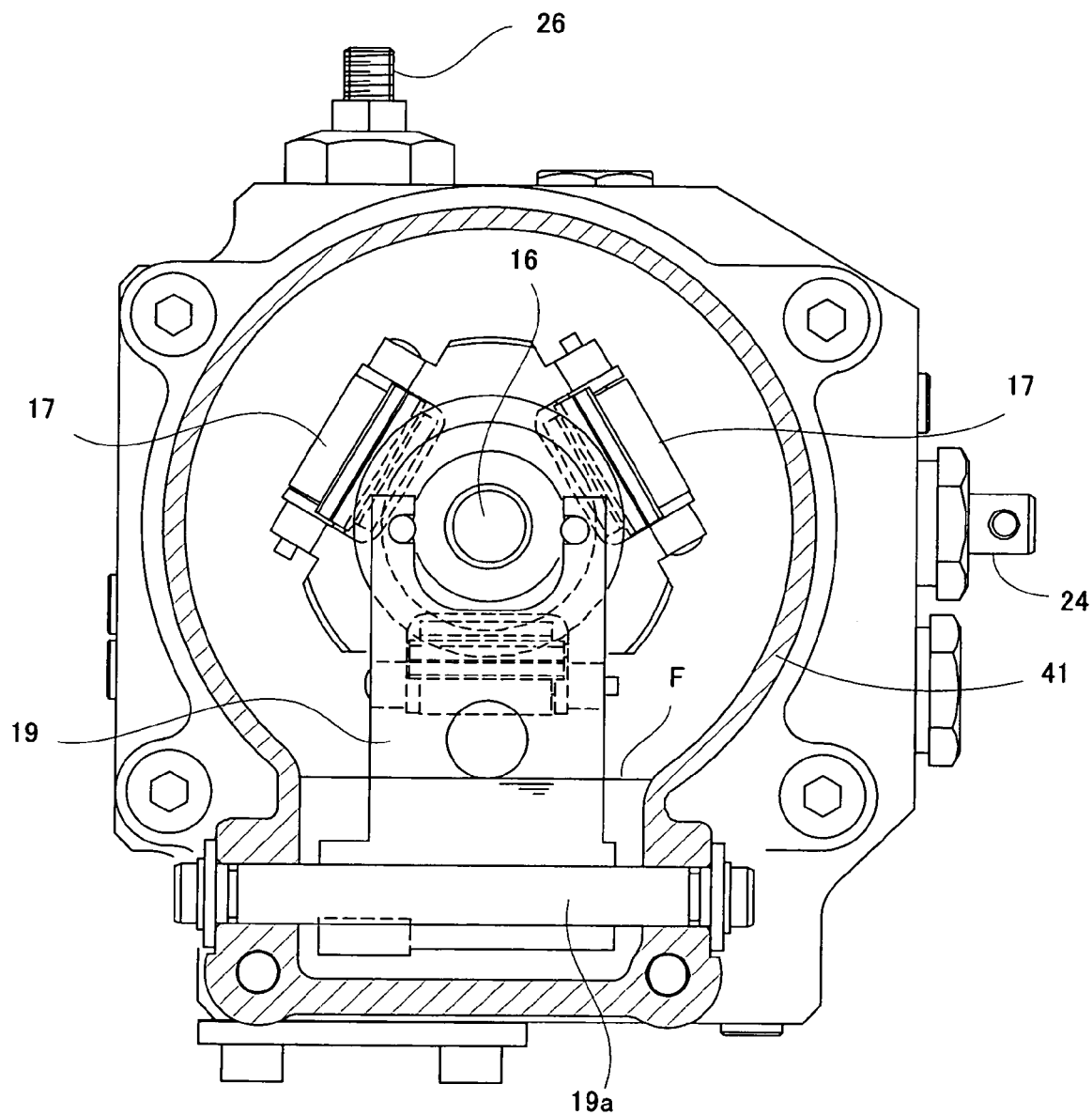
FIG. 16 shows the internal structure of a governor casing cut along the line D in FIG. 14 and seen from E.
Figure 17:
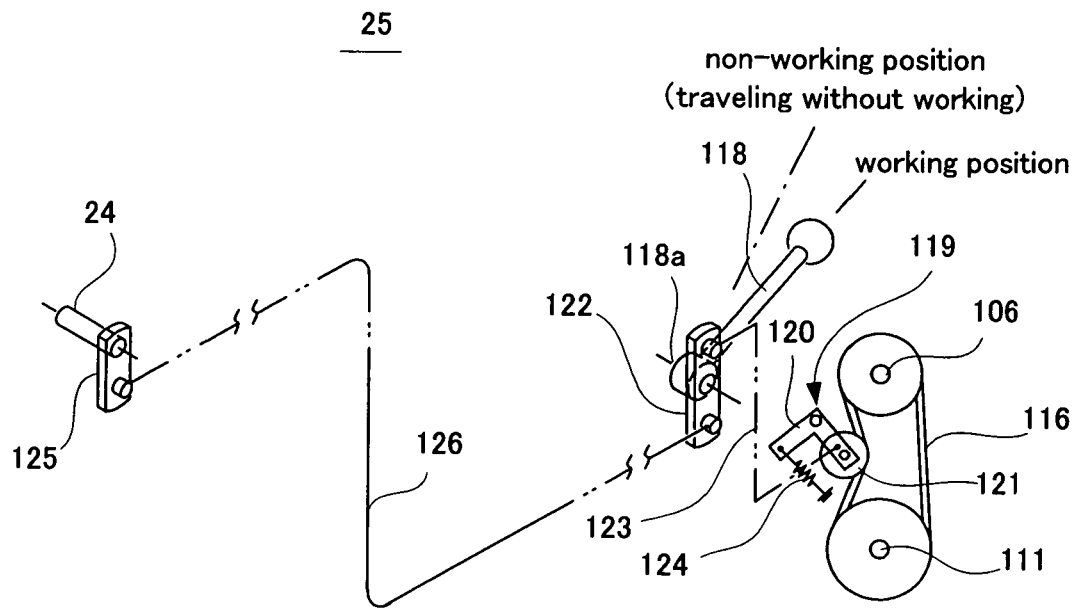
FIG. 17 is an explanatory drawing schematically illustrating a clutch interlocking system for an implement that is a constituent component of the load controller of the sixth embodiment.

A hydrostatic transmission comprising an oil-hydraulic circuit as shown in FIG. 13 is explained below with reference to FIGS. 14 to 18. FIG. 14 is a longitudinal front view showing a part of the hydrostatic transmission. FIG. 15 is a longitudinal side elevational view taken along the line B-B in FIG. 14. FIG. 16 is a front view of the governor casing 41 cut along the line C-C in FIG. 14 and seen from direction D. FIG. 17 is an explanatory drawing that schematically illustrates a clutch interlocking system for an implement. Note that FIG. 14 is similar to the cross section F-F in FIG. 3.

As shown in FIG. 14, the hydrostatic transmission 1 comprises an oil-hydraulic pump 2, an oil-hydraulic motor (not shown), etc., housed in a housing 30. Note that because the inner structure of the housing 30 is similar to that shown in FIG. 3, a detailed explanation is omitted here.

The housing 30 has an opening in the external surface thereof on the opposite side from which the input shaft 2a of the oil-hydraulic pump 2 projects. To close this opening 30a, a valve casing 36 integrally comprising a below-explained governor casing 41 is provided on the external wall surface of the housing 30 in an oiltight manner.

The valve casing 36 is provided with a centrifugal governor G. As shown in FIGS. 14 and 16, the governor casing 41 is attached to the valve casing 36 and structured so as to seal the centrifugal governor G. Lubricating oil F, which is used to lubricate the parts that require lubrication, is stored in the closed chamber. If the parts that require lubrication can function satisfactorily only by applying a heat-resistant grease, etc., storing the lubricating oil F is unnecessary. The surface level of the lubricating oil F is controlled so that when the flyweight 17 rotates together with the revolution number detection shaft 16 and the flyweight 17 oscillates and opens due to centrifugal force, the flyweight 17 comes into contact with the surface of the lubricating oil. When the flyweight 17 rotates in an open state (the condition shown by the two-dot chain line in FIG. 14) and comes into contact with the surface of the lubricating oil, the lubricating oil scatters in the governor casing 41 and the oil pours into the centrifugal governor G.

As shown in FIG. 15, a first opening/closing valve 9, a fixed throttle 21, a pressure compensation valve 20, a second opening/closing valve 24, and a check valve 11 are incorporated in the valve casing 36.

In the first opening/closing valve 9, a spool is pressed toward the feedback arm 19 by a spring 9S having the shape of an offset coil. The energizing force that the spring 9S applies to the first opening/closing valve 9 can be controlled by a control screw 26. Note that, because the governor force generated in the centrifugal governor G is easily affected by the force of inertia, even if the number of revolutions of the engine is decreased, some governor force remains. This may cause a delayed response in the first opening/closing valve 9. In order to reduce this delay, a double coil with different levels of energizing force is employed as the spring 9S in this embodiment.

The flow control valve 10 integrally composes the pressure compensation valve 20 and the fixed throttle 21. The fixed throttle 21 controls the flow rate of the working oil passing therethrough. The pressure compensation valve 20 is constantly open due to the coil spring 20a, and reduces the flow of working oil when the pressure of the working oil in the oil line 8b exceeds the energizing force of the coil spring 20a. The pressure compensation valve 20 thereby prevents high-pressure working oil from rapidly flowing into the oil line 3b from the oil line 3a via the by-pass oil line 8.

In the example illustrated, a rotary 2-position directional control valve is used as a second opening/closing valve 24. As described above, the second opening/closing valve 24 can be voluntarily and manually switched using a control lever (not shown). It is also possible to interlock the second opening/closing valve 24 with the clutch lever for an implement 118. This is explained below with reference to FIG. 17.

Driving force is transferred from an engine E to an implement (an auger in the example shown in FIG. 17) via a tension belt 116. A tension clutch 119, which applies or releases tension, is mounted to the tension belt 116. The tension clutch 119 is turned on or off by the operation of the clutch lever for an implement 118.

The tension clutch 119 comprises a tension roller 121 that is rotatably attached to a first oscillating arm 120, a clutch lever for an implement 118, a second oscillating arm 122 fixed to a rotation axis 118a of the clutch lever for an implement 118, and a wire 123 connecting the first oscillating arm 120 with the second oscillating arm 122. Tension is constantly applied to the tension roller 121 by the spring 124, and when the clutch lever for an implement 118 is switched to the OFF position, the tension roller 121 is detached from the tension belt 116 and the tension is decreased.

A third oscillating arm 125, which rotates the rotary 2-position directional control valve forming the second opening/closing valve 24, is fixed to the second opening/closing valve 24, and the third oscillating arm 125 is connected to the second oscillating arm 122 by a wire 126. When the clutch lever for an implement 118 is at the "working" position as shown in the figure, the second opening/closing valve 24 is in an open position. When the clutch lever for an implement 118 is shifted to the "non-working" position (shown by the chain line), the third oscillating arm 125 is oscillated via the second oscillating arm 122 and the wire 126, the rotary 2-position directional control valve that forms the second opening/closing valve 24 rotates, and the second opening/closing valve 24 is switched to the close position. The operation of a hydrostatic transmission having the above-described structure is explained below.

When the engine E is halted, the first opening/closing valve 9 is at the throttle position having the greatest degree of opening, but the clutch lever for an implement 118 is at the close position, and therefore the second opening/closing valve 24 is at the close position. Accordingly, the by-pass oil line 8 is closed.

When the engine E starts, the center of gravity of the flyweight 17 fixed to the revolution number detection shaft 16 shifts in the centrifugal direction in accordance with the increase in the number of revolutions of the engine E, and the resulting displacement is transmitted to the slider 18. In accordance with the displacement of the slider 18, the feedback arm 19 rotates, having the pivot shaft 19a as its center, and the spool of the first opening/closing valve 9 is shifted against the coil spring 9S.

When the number of revolutions of the engine E increases and the number of revolutions detected reaches the predetermined number, i.e., the number of revolutions for driving the implement, the first opening/closing valve 9 switches to the close position.

The range of the number of revolutions at which the first opening/closing valve 9 switches its position can be suitably selected depending on the horsepower of the engine, the type of the work vehicle, etc., and can be controlled by the control screw 26.

For example, when the work vehicle provided with the hydrostatic transmission 1 is a snowplow, assuming that the number of revolutions of the engine while driving the auger, which is the implement, is 2000-3000 rpm, and the number of revolutions during travel without removing snow is 0-1000 rpm, the first opening/closing valve 9 is designed to be closed when the number of revolutions falls into the range of 2000 to 3000 rpm. While removing snow, the clutch lever for an implement 118 is at the open position, and the second opening/closing valve 24 is at the close position. Therefore, the by-pass oil line 8 is closed by the first opening/closing valve 9 when the number of revolutions is in the range of 2000 to 3000 rpm, i.e., during working travel. When the number of revolutions of the revolution number detection shaft 19 is less than 2000 rpm due to an overload applied to the auger while removing snow, the first opening/closing valve 9 opens under a throttled condition. Here, because the second opening/closing valve 24 is already open, it is possible to route a part of the high-pressure oil from a high-pressure oil line 3a to a low-pressure oil line 3b in the oil-hydraulic closed circuit that composes a hydrostatic transmission.

The axle 114 reduces the rotation speed, so that the output shaft 106 can distribute the driving torque from the output shaft 106 to the PTO shaft 111 (auger, etc.) to the maximum extent. The absorption torque (load torque) from the axle 114 to the output shaft 106 is reduced or almost eliminated, and the torque is applied to the PTO shaft 111 at the maximum extent. Therefore, the amount of snow entering the auger is reduced due to the reduction in the number of revolutions of the axle 114. The blockage of snow in the auger that caused the overload is thus reduced and the overload to the PTO shaft 111 is resolved.

When the overload to the PTO shaft 111 is resolved, the number of revolutions of the output shaft 106 of the engine E returns to the original level. When the number of revolutions of the output shaft 106 returns to the original level, the centrifugal governor G is actuated to reclose the first opening/closing valve 9. As a result, the number of revolutions of the axle 114 returns to the original level, and the snowplow removes snow while traveling forward at the original speed.

When the overload to the PTO shaft 111 is resolved, the number of revolutions of the output shaft 106 of the engine E returns to the original level. Upon return of the number of revolutions of the output shaft 106 to the original level, the centrifugal governor G is actuated and the first opening/closing valve 9 is reclosed. As a result, the number of revolutions of the axle 114 returns to the original level, and therefore the snowplow can remove snow while traveling at the original speed. A halt of the engine due to an overload can thereby be prevented and snow removal can be smoothly conducted.

In the sixth embodiment described above, the second opening/closing valve 24 is interlocked with the clutch lever for an implement 118 and can be operated externally. Therefore, for example, if the clutch lever for an implement 118 is shifted to the engaged position while keeping the engine E at a low-revolution level, the second opening/closing valve 24 opens in conjunction with such operation (the first opening/closing valve 9 is substantially completely open at the low-revolution level). This opens the by-pass oil line 8 and significantly lowers the efficiency of the hydrostatic transmission 1. This makes it impossible to drive the oil-hydraulic motor 4.

Figure 18:
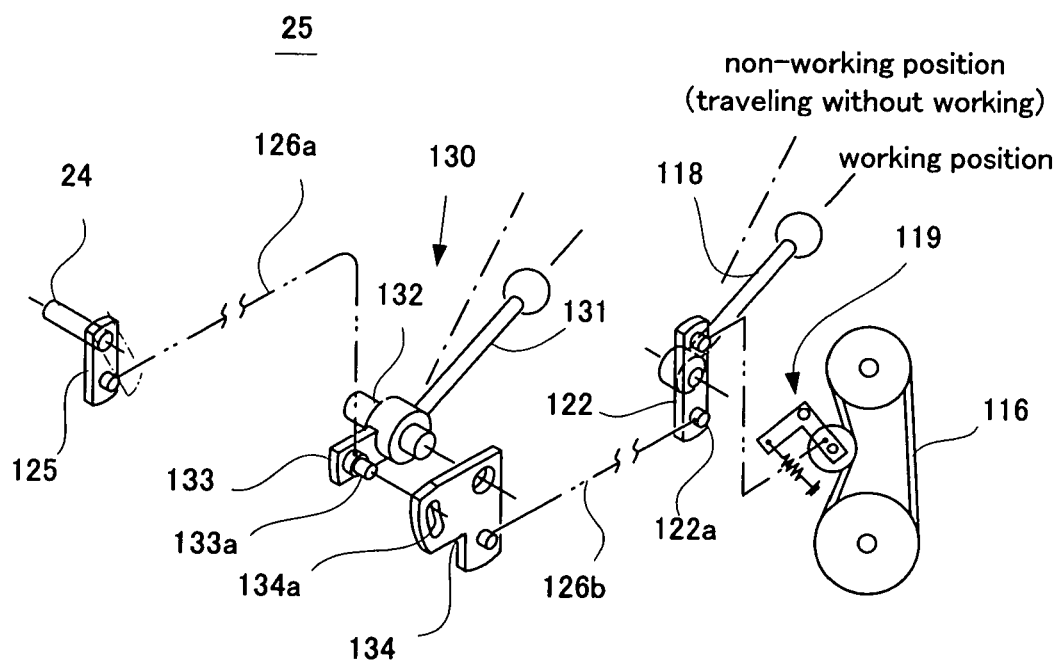
FIG. 18 is an explanatory drawing in which an intermediate switching mechanism is added to a clutch interlocking system for an implement of FIG. 17.

As shown in FIG. 18, it is possible to include an intermediate switching mechanism 130, which can open and close the second opening/closing valve at the ON position of the clutch for an implement 118, somewhere in a clutch interlocking system for an implement 25, specifically, somewhere on the wire 126 that connects the second oscillating arm 122 with the third oscillating arm 125.

The intermediate switching mechanism 130 comprises a rotatably supported, manually switched lever 131, a fourth oscillating arm 133 fixed to the rotating axis 132 of the manually switched lever 131, and an L-shaped oscillating arm 134 that is loosely and swingably fitted to the rotation axis 132 of the manually switched lever 131, wherein a pin 133a fixed to the fourth oscillating arm 133 is inserted into an oval hole 134a formed in one end of the L-shaped oscillating arm 134, the pin 133a is connected to the third oscillating arm 125 by a wire 126a, and a pin 134b formed on the other end of the L-shaped oscillating arm 134 is connected to the pin 122a fixed to one end of the second oscillating arm 122 by a wire 126b.

FIG. 18 shows the condition in which the clutch for an implement 117 is in the working position. In this condition, the pin 133a of the fourth oscillating arm 133 contacts the upper end of the oval hole 134a of the oscillating arm 134, and the manually switched lever 131 is in the position in which the second opening/closing valve 24 is open. In this condition, the pin 133a can be moved (downwardly) along the oval hole 134a, and therefore it is possible to switch the second opening/closing valve 24 to the closed position by rotating the manually switched lever 131 in the counterclockwise direction as seen in the figure. Therefore, it is possible to prevent the oil from leaking from the oil line 3a via the first opening/closing valve 9 and to make the snowplow travel with an excellent efficiency in the hydrostatic transmission 1.

When the clutch lever for an implement 118 is shifted from the operating condition as shown in FIG. 18 to the non-working position shown by the chain line, the second oscillating arm 122 swings and makes the L-shaped oscillating arm 134 swing via the wire 126b, rotates the fourth oscillating arm 133 together with the manually switched lever 131 via the pin 133a, and shifts the second opening/closing valve 24 to the closed position as shown by the chain line in FIG. 18.

When the clutch lever for an implement 118 is in the non-working position, the manually switched lever 131 cannot be rotated. In other words, when the clutch lever for an implement 118 is in the non-working position, the second opening/closing valve 24 is fixed to the closed position, and the clutch lever for an implement 118 takes priority over the manually switched lever 131.

In the above-described sixth embodiment, the second opening/closing valve 24 is interlocked with the clutch for an implement; however, it is also possible to employ a structure (a seventh embodiment) in which the second opening/closing valve 24 is interlocked with the gearshift 140 (see FIGS. 8 and 13), or in which the second opening/closing valve 24 is interlocked with the adjustable swash plate control lever 32*a* (see FIGS. 8 and 13, an eight embodiment). The seventh embodiment is explained below in detail. Note that in the following explanation, the same symbols are used for the same parts in the above-described sixth embodiment and not shown in the figure.

The speed change gear, which is operated by the gearshift 140, is a transmission that can switch traveling speed into working speed or non-working speed via a gear mechanism. The speed change gear includes an oil pressure clutch transmission (power shift clutch transmission).

The adjustable swash plate control lever 32*a* is a control lever that controls the adjustable swash plate 31 (see FIG. 3) of the oil-hydraulic pump 2. Note that, in the hydrostatic transmission shown in the figure, the oil-hydraulic pump is a variable displacement type, and therefore the adjustable swash plate is provided with an oil-hydraulic pump; however, it is also possible to provide a variable displacement type oil-hydraulic motor instead of the motor oil-hydraulic pump. In this case, the adjustable swash plate control lever controls the adjustable swash plate of the oil-hydraulic motor.

The gearshift interlocking system that interlocks the gearshift 140 with the second opening/closing valve is structured so as to open the second opening/closing valve 24 at the working speed position of the gearshift 140 under a throttled condition, and close the second opening/closing valve 24 at the non-working speed position of the gearshift 140.

With this structure, when the implements 102 and 103 are driven while placing the gearshift 140 in the working speed position, the second opening/closing valve 24 opens while being interlocked with the gearshift interlocking system; however, the number of revolutions of the engine E is at a high level (for example, 2000-3000 rpm) to obtain an operation output by actuating an accelerator, and the first opening/closing valve 9 is closed due to the operation of the centrifugal governor G. Therefore, it is possible to drive the implement while traveling at a working speed. If an overload is applied for some reason while such a work vehicle is under working operation, in the same way as in the above-described sixth embodiment, due to the operation of the centrifugal governor G, the first opening/closing valve 9 is opened under a throttled condition, and therefore a halt of the engine is prevented by making the drive of the implement take priority.

In contrast, when the snowplow is traveling without conducting work, the gearshift 140 is in the non-working speed position, the accelerator is actuated so that the number of revolutions of the engine E is in the range of ordinary traveling (for example, 1000 rpm), and the centrifugal governor G keeps the first opening/closing valve 9 open under a throttled condition. In this condition, the second opening/closing valve 24 is closed while being interlocked with the gearshift 140, and therefore it is possible to make the snowplow travel with excellent efficiency in the hydrostatic transmission 1.

If the engine E is at a low-revolution level with the hydrostatic transmission 1 at neutral, the second opening/closing valve 24 is open when the gearshift 140 is in the working speed position, and the first opening/closing valve 9 is open to almost the maximum degree due to the operation of the centrifugal governor G. In this case, when the clutch lever for an implement 118 is engaged, the implements 102 and 103 can be driven even with the engine E at a low-revolution level.

However, because the first opening/closing valve 9 and the second opening/closing valve 24 are open, it is impossible to make the snowplow travel by switching the hydrostatic transmission 1 to the transmitting position from the condition wherein the implement is operated with the engine E at a low-revolution level. Therefore, it is preferable that the second opening/closing valve 24 can be voluntarily opened or closed at the working speed position by providing an intermediate switching mechanism, similar to that of the sixth embodiment, in the gearshift interlocking system of the seventh embodiment. By providing such an intermediate switching mechanism, in the same way as the sixth embodiment, it is possible to make the snowplow travel while operating the implement under the condition wherein the number of revolutions of the engine is not great enough so that the centrifugal governor G closes the first opening/closing valve 9.

In the seventh embodiment, one example wherein the second opening/closing valve 24 is interlocked with the gearshift lever is explained; however, it is also possible to employ a structure described in an eighth embodiment wherein the second opening/closing valve 24 is interlocked with the adjustable swash plate control lever 32*a* (see FIGS. 3 and 13). The eight embodiment is explained below in detail. In the following explanation, the same symbols are used for parts that are similar to those in the above-described sixth embodiment, and such parts are not shown in the figure.

The adjustable swash plate control lever 32*a* steplessly varies the number of revolutions of the oil-hydraulic motor 4 by changing the angle of inclination of the adjustable swash plate 31 of the oil-hydraulic pump 2 and varying the amount of oil discharged.

Figure 19:
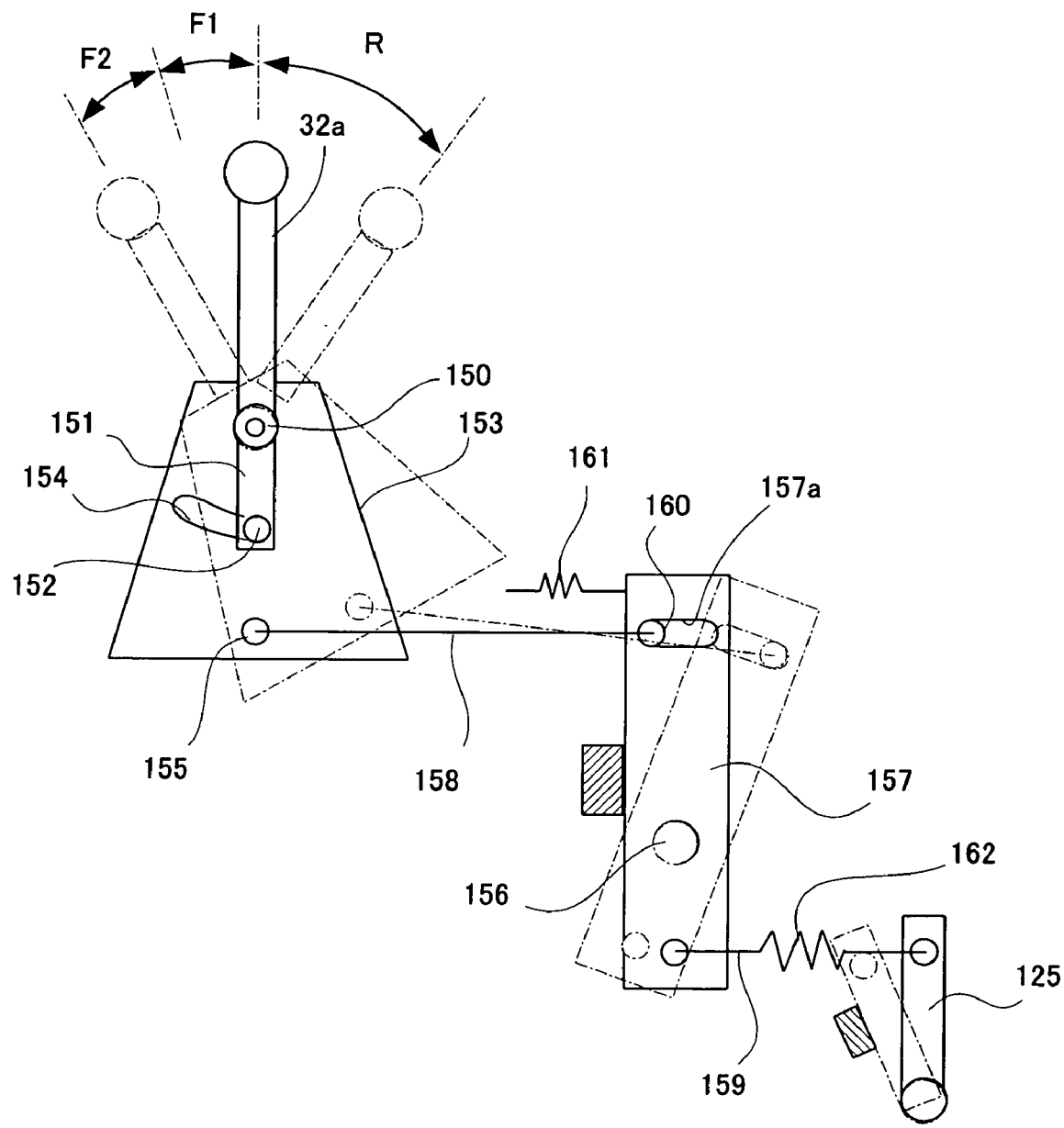
FIG. 19 is an explanatory drawing schematically illustrating an adjustable swash plate interlocking system that is a constituent component of the load controller of the eighth embodiment of the present invention.

As shown in FIG. 19, the adjustable swash plate interlocking system that interlocks the adjustable swash plate control lever 32*a* with the second opening/closing valve 24 may be structured so that when the adjustable swash plate control lever 32*a* is in the working speed position, the second opening/closing valve 24 is open, and when the adjustable swash plate control lever 32*a* is in the non-working speed position, the second opening/closing valve is closed. The adjustable swash plate interlocking system is explained below.

The adjustable swash plate control lever 32*a* comprises a boss that is rotatably disposed on a supporting shaft 150 with which an oscillating bar 151 extending in the direction opposite to the lever is integrally formed. A pin 152 extending in a direction as if it were "penetrating" the drawing is fixed to one end of the oscillating bar 151. An oscillating plate 153 is unitedly and rotatably fixed to the supporting shaft 150 together with a lever 32*a*, and an arc-shaped hole 154 in which the pin 152 can move is formed in the oscillating plate 153. A pin 155 extending end ways in the drawing is fixed to the bottom end of the oscillating plate 153. When the adjustable swash plate control lever 32*a* is in the position shown in the figure, the hydrostatic transmission 1 operation is neutral. When the adjustable swash plate control lever 32*a* is tilted to the left in the drawing, the hydrostatic transmission 1 is shifted to the rear position (R). When the adjustable swash plate control lever 32*a* is tilted to the right in the drawing, the hydrostatic transmission 1 is shifted to a forward operation position (F1 or F2). There are two regions in the forward operation position depending on the tilt angle of the adjustable swash plate control lever 32a, i.e., the first half of the tilt region F1 is the working speed region and the second half of the tilt region F2 is the non-working speed region.

An intermediate oscillating bar 157 that can swing around a shaft 156 is coupled between the oscillating plate 153 and a third oscillating arm 125 that rotates (opens) the rotary 2-position directional control valve composing the second opening/closing valve 24 via wires 158 and 159. An oval hole 157a is formed in the upper end of the intermediate oscillating bar 157, and a slidable pin 160 is housed in the oval hole 157a. The pin 155 is interlocked with the pin 160 via the wire 158. The bottom end of the intermediate oscillating bar 157 is interlocked with the upper end of the third oscillating arm 125 via the wire 159. In the figure, 161 indicates a returning spring and 162 indicates a spring for lost motion.

When the adjustable swash plate control lever 32a is in the neutral position as shown in FIG. 19, the second opening/closing valve 24 is in the open position, and therefore overload can be controlled using the centrifugal governor G. Even when the adjustable swash plate control lever 32a is tilted to the rear (R) position, only the pin 152 moves along the arc-shaped hole 154 and the oscillating plate 153 does not swing nor make the third oscillating arm 125 swing, and therefore the second opening/closing valve is kept open.

When the adjustable swash plate control lever 32a is tilted toward the working speed position (F1), the oscillating plate 153 swings, but only the pin 160 moves in the oval hole 157a of the intermediate oscillating bar 157 and the intermediate oscillating plate 157 does not swing. Therefore, also in this case, the second opening/closing valve 24 is open.

When the adjustable swash plate control lever 32a is further tilted and placed in the non-working speed position (F2), the third oscillating arm 125 is swung to the position shown by the chain line in the figure via the oscillating plate 153, wire 158, pin 160, intermediate oscillating bar 157, and wire 159, so that the second opening/closing valve 24 is closed.

As described above, it is possible to link the stepless speed variation conducted by the adjustable swash plate control lever 32a to the opening or closing of the second opening/closing valve 24.

In the eighth embodiment, which is provided with the adjustable swash plate interlocking system, when the adjustable swash plate control lever 32a is in the working speed position (F1) by driving the engine E, the second opening/closing valve 24 is opened, but when the number of revolutions of the engine E is set to an operation level (for example, 2000-3000 rpm) by actuating an accelerator, the first opening/closing valve 9 is closed by the operation of the centrifugal governor G. Therefore, when the clutch for an implement 117 is released and the gearshift 140 is shifted to the traveling speed position, it is possible to drive the implements 102 and 103 while traveling at a low speed. When an overload is applied to the implements 102 and 103, the number of revolutions of the engine E is reduced, and the first opening/closing valve 9 is opened due to the operation of the centrifugal governor G, the by-pass oil line 8 is opened, and a part of the high-pressure oil is routed from the high-pressure oil line 3a to the low-pressure oil line 3b. This reduces the speed of the snowplow, makes it possible to distribute the driving force of the engine E to the implements 102 and 103, resolves the overload, and prevents the halt of the engine.

When the adjustable swash plate control lever 32a is tilted from the working speed position (F1) to the traveling speed position (F2), the by-pass oil line 8 is closed because the second opening/closing valve 24 is closed, and therefore the overload control function is not fulfilled. However, when a snowplow is traveling without removing snow, because the implements 102 and 103 are not driven, the function for controlling overload is unnecessary.

Figure 20:
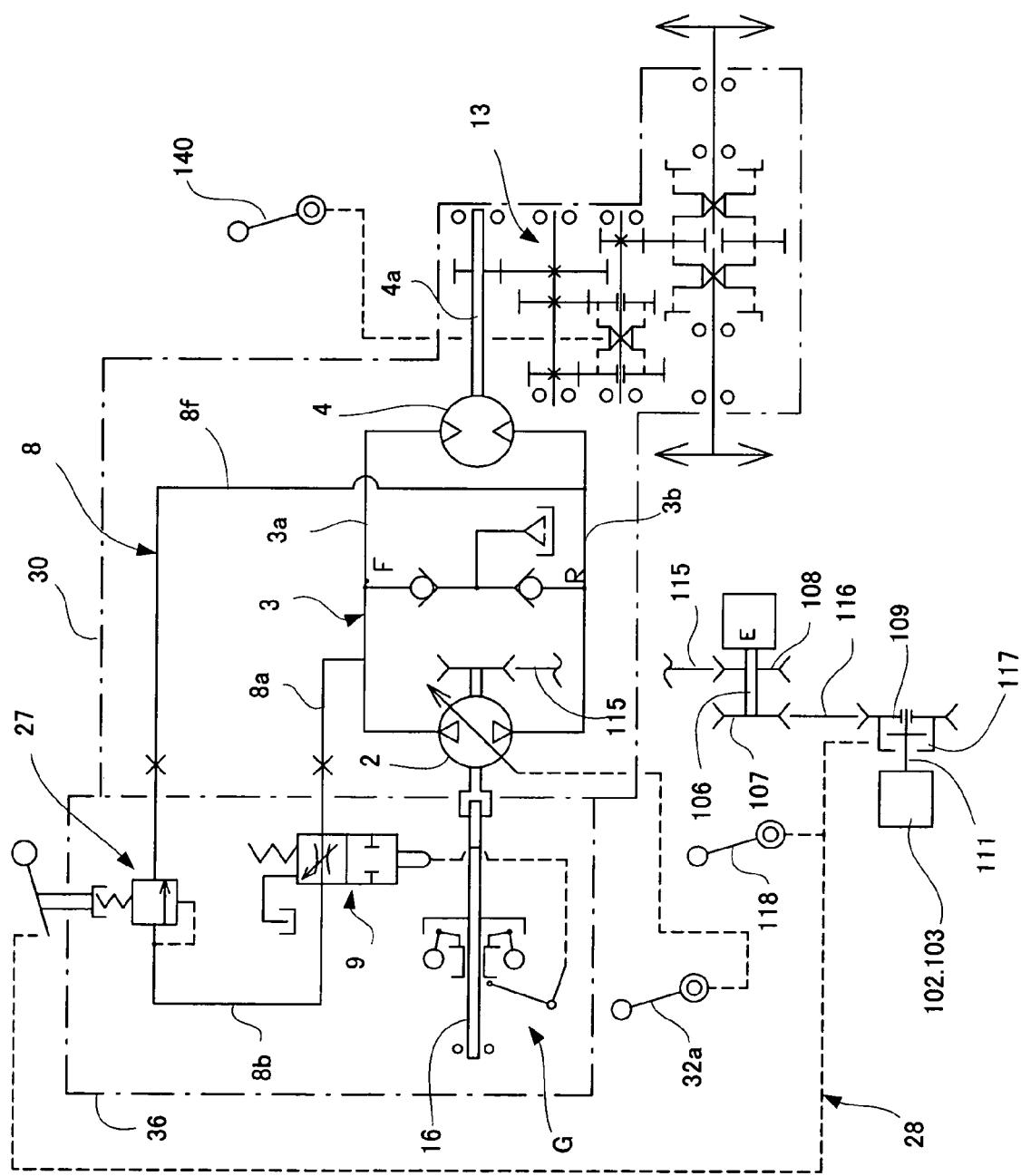
FIG. 20 is an oil-hydraulic circuit diagram showing the load controller of the ninth embodiment of the present invention.

A ninth embodiment of the load controller for a hydrostatic transmission mounted on a work vehicle of the present invention is explained below with reference to FIGS. 20 and 21.

The ninth embodiment is the same as the sixth embodiment except that, instead of the flow control valve, second opening/closing valve 24 and fixed check valve 11 in the sixth embodiment, a check valve with a set-pressure adjuster 27, which allows a one-way flow of the working oil from the valve-outlet side of the first opening/closing valve in the by-pass oil line and that can block such a one-way flow by external operation, is disposed on the valve-outlet side of the first opening/closing valve 9, and the check valve with a set-pressure adjuster 27 is interlocked with a clutch lever for an implement using a clutch/check valve interlocking system.

Figure 21:
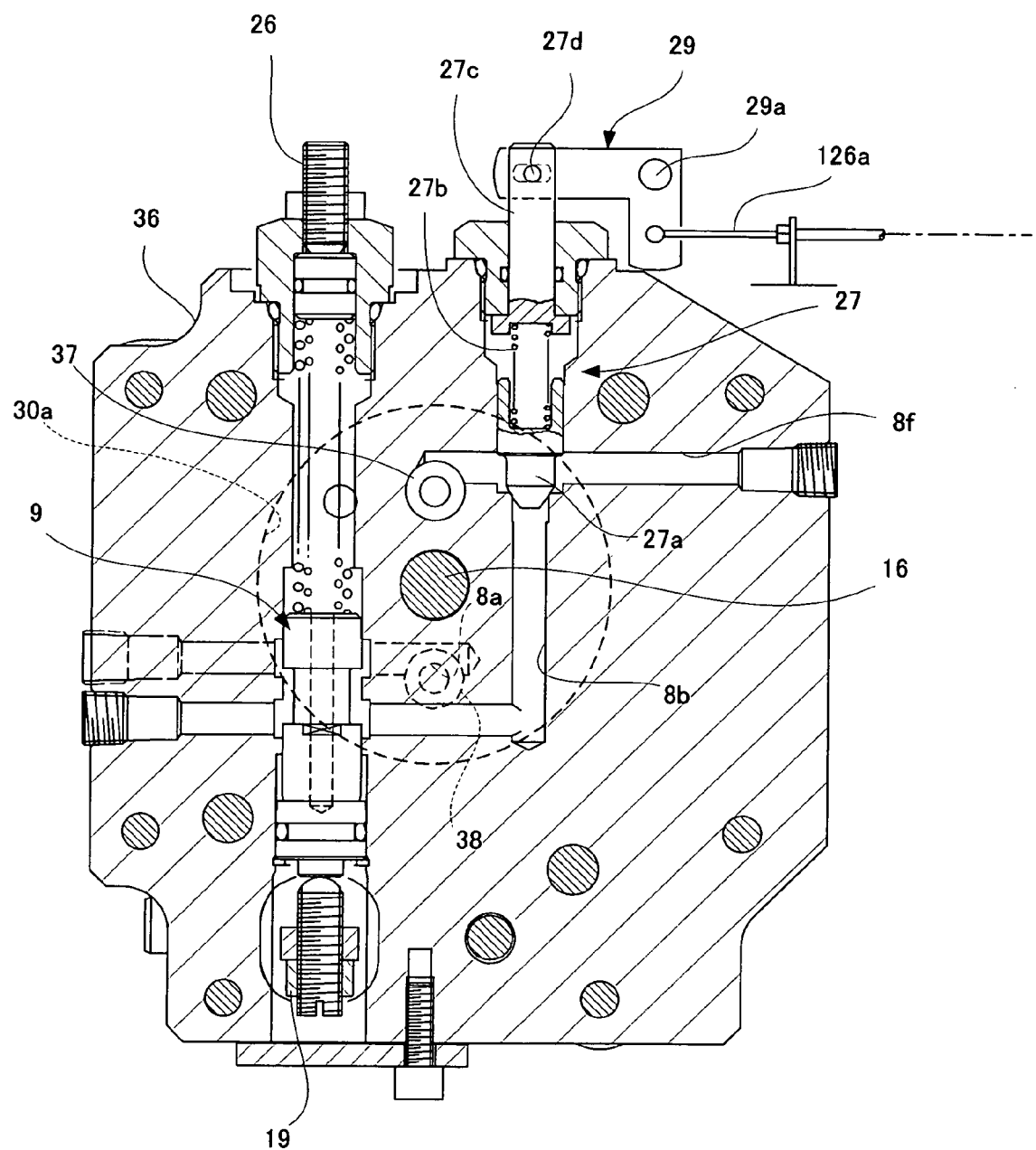
FIG. 21 is a longitudinal side view showing a load controller according to the ninth embodiment of the present invention.

As shown in FIG. 21, the check valve with a set-pressure adjuster 27 comprises a valve body 27a, a spring 27b, and a movable spring receiver 27c. In the embodiment shown in FIG. 21, the check valve with a set-pressure adjuster 27 is a poppet type check valve, which allows a one-way flow (in the direction indicated by the arrow in the figure) and blocks the flow in the opposite direction when the spring 27b is at the ordinary setting pressure. The set-pressure adjuster 27 can also block the one-way flow by enhancing the elastic force of the spring 27b by shifting the movable spring receiver 27c toward the valve body 27a.

Figure 22:
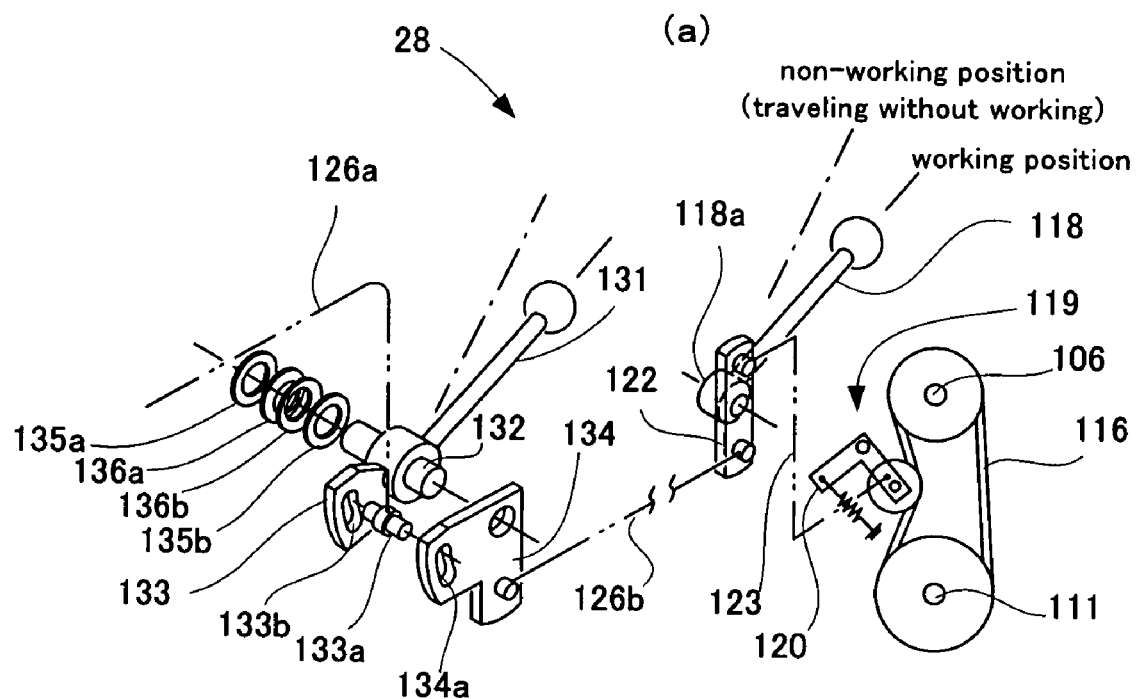
FIG. 22 is an explanatory drawing schematically illustrating a clutch interlocking system for the implement that is a constituent component of the load controller of the ninth embodiment.
Figure 22:
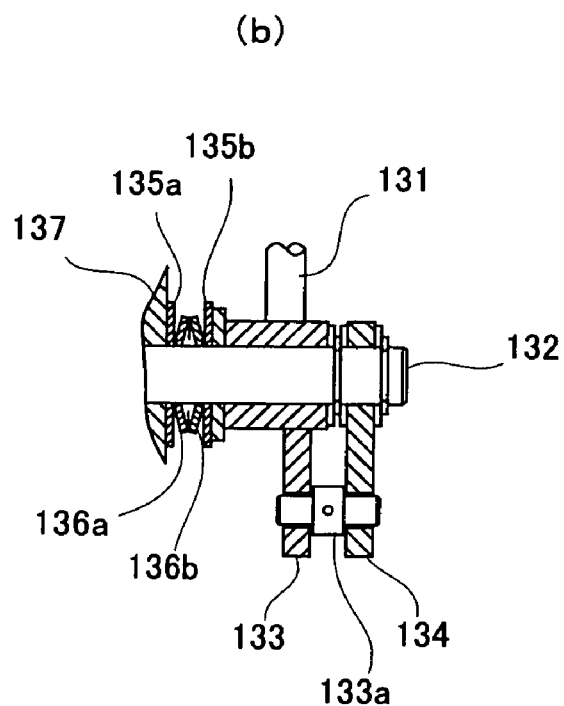

The movable spring receiver 27c is interlocked with a manual control lever (not shown); however, the movable spring receiver 27c may be interlocked with the clutch lever for an implement 118. A clutch/check valve interlocking system 28 that interlocks the clutch lever for an implement 118 with the movable spring receiver 27c is shown in FIG. 22. FIG. 22(a) shows an exploded perspective view of the clutch/check valve interlocking system 28, and FIG. 22(b) shows a cross-sectional view of part of the clutch/check valve interlocking system 28.

Similar to the interlocking system shown in FIG. 18, the clutch/check valve interlocking system 28 has a friction mechanism so that the intermediate switching mechanism can maintain continuously variable positions from open to closed. Specifically, an arc-shaped oval hole 133b having a shape similar to that of the oval hole 134a in the L-shaped oscillating arm 134 is also formed in the fourth oscillating arm 133, and a pin 133a is slidably inserted in the oval holes 133b and 134a. Furthermore, the rotating axis 132 of the switching lever 131 is provided with a friction mechanism comprising friction plates 135a and 135b, and coned disc springs 136a and 136b sandwiched between the friction plates 135a and 135b. Note that, in FIG. 22(b), 137 indicates a fixed surface to which the friction plate 135a is connected.

The movable spring receiver 27c receives a spring 27b in one end and the other end thereof protrudes from the valve casing 36. The above-mentioned other end of the movable spring receiver 27c is interlocked with a pin 27d via one end of an L-shaped arm that can swing around the shaft 29a. The other end of the L-shaped arm 29 is interlocked with a pin 133a of the fourth oscillating arm 133 via a wire 126a.

FIG. 22(a) shows the condition in which the clutch lever for an implement 118 is in the working position and the pin 133a contacts the upper ends of the oval holes 134a and 133b. In this condition, because the pin 133a can swing in the oval hole 133b of the fourth oscillating arm 133, the intermediate switching lever 131 can be shifted by a frictional force exceeding the maximum energizing force of the spring 27b, and maintain its position while steplessly adjusting the set pressure in the check valve from minimum to maximum with the set-pressure adjuster 27. It is also possible to lock the valve body 27a so as to completely block the oil flow by mechanically causing the movable spring receiver 27c to contact the valve body 27a.

When the clutch lever for an implement 118 is lifted from the condition shown in FIG. 22(a) to the position shown by the chain line, a tension clutch 119 is disengaged due to the operation of the first oscillating arm 120, the pin 133a is moved in the direction downward in the figure via the second oscillating arm 122, wire 126b, and L-shaped oscillating arm 134a. The L-shaped arm 29 is made to swing by pulling the wire 126a, and the pressure of the spring 27b is kept at a level higher than that of the working oil passing through the oil line 3a. The one-way flow of the working oil is thereby blocked. It is also possible to shift the intermediate switching lever 131 in this condition; however, because the pin 133a is placed in the oval hole 133b without changing its position, operation of the check valve with a set-pressure adjuster 27 is unnecessary.

In the ninth embodiment having the above-described structure, when the clutch lever for an implement 8 is released while traveling during working, the set pressure of the check valve with a set-pressure adjuster 27 can be controlled due to the intermediate switching lever 131. Overload can be controlled by suitably positioning the intermediate switching lever 131 in such a manner that the set pressure of the check valve with a set-pressure adjuster 27 is reduced.

When the implements 102 and 103 are driven and an overload is applied, the first opening/closing valve 9 is opened under a throttled condition due to the operation of the centrifugal governor G, and the by-pass oil line 8 opens. However, by adjusting the position of the intermediate switching lever 131 and using the energizing force of the spring 27b at that position, the flow rate of the oil passing through the by-pass oil line 8 is controlled and the power distributed to the implements 102 and 103 is increased, so that the implements 102 and 103 can be operated without stopping the snowplow, and halting of the engine can also be prevented.

Even when the engine is at a low-revolution level, operation can be conducted by shifting the clutch lever for an implement 118 into the ON position. To make the snowplow travel while working, the intermediate switching lever 131 is shifted to the closed position and the set pressure of the check valve with a set-pressure adjuster 27 is increased so as to block the one-way flow of the oil. This allows the snowplow to travel without lowering the efficiency of the hydrostatic transmission 1.

In the case where the snowplow is made to travel without working, when the clutch lever for an implement is shifted to the position shown by the chain line in FIG. 22(a), the tension clutch 119 in the implement system is disengaged, and the pin 133a, wire 126a, L-shaped arm 29, and movable spring receiver 27c are connected with the clutch lever for an implement 118. Subsequently, the set pressure of the check valve with a set-pressure adjuster 27 becomes the maximum, and therefore the by-pass oil line 8 is closed. Accordingly, the oil-hydraulic motor 4 is driven by the oil-hydraulic pump 2, allowing the snowplow to travel.

As described above, a smaller number of parts is used and a simpler structure is employed in the ninth embodiment compared to the sixth embodiment, the valve casing 36 can be miniaturized, and the load controller can be manufactured at a lower cost.

In the ninth embodiment, the check valve with a set-pressure adjuster is interlocked with the clutch lever for an implement 118; however, the check valve with a set-pressure adjuster 27 may be interlocked with the gearshift 140 or the adjustable swash plate control lever 32a as shown in the seventh and eight embodiments.

The speed change gear/check valve interlocking system for interlocking the check valve with a set-pressure adjuster 27 to the gearshift 140 is structured so that when the gearshift 140 is at the non-working speed position, the set pressure of the spring 27b is increased by moving the movable spring receiver 27c toward the valve body 27a to block the one-way flow of the oil passing through the by-pass oil line 8. The speed change gear/check valve interlocking system may be provided with an intermediate switching mechanism that can control the set pressure of the check valve with a set-pressure adjuster when the gearshift is in the working speed position. In this case, the intermediate switching mechanism may have the same structure as shown in FIG. 22.

Having a such structure makes it possible to fulfill a function similar to that fulfilled by the ninth embodiment. When the gearshift 140 is in the working speed position, the check valve with a set-pressure adjuster 27 allows the one-way flow of the oil, but the first opening/closing valve 9 is closed due to the operation of the centrifugal governor G, and therefore the snowplow can travel while working. When the number of revolutions of the engine E is reduced due to an overload, the centrifugal governor G detects this and the first opening/closing valve 9 opens under a throttled condition to control the overload. When the gearshift 140 is in the working speed position, it is possible to turn on or off the overload control system by controlling the set pressure of the check valve with a set-pressure adjuster 27 by manually shifting the intermediate switching lever 131. When the gearshift 140 is in the non-working speed position, the check valve with a set-pressure adjuster 27 blocks the one-way flow of the oil, and therefore the snowplow can travel.

The adjustable swash plate/check valve interlocking system that interlocks the check valve with a set-pressure adjuster 27 with the adjustable swash plate control lever 32a is structured so that the one-way flow of oil passing through the by-pass oil line 8 is blocked by increasing the set pressure of the spring by moving the movable spring receiver toward the valve body in accordance with the shift of the adjustable swash plate control lever 32a from the non-working speed position to the working speed position. An intermediate switching mechanism may be provided in the adjustable swash plate/check valve interlocking system, which can control the set pressure of the check valve with a set-pressure adjuster when the adjustable swash plate control lever is in the working speed position. The intermediate switching mechanism in this case can also employ the same structure as shown in FIG. 22, and the intermediate switching mechanism can fulfill a function similar to that of the ninth embodiment.

In other words, when the adjustable swash plate control lever 32a is in the working speed position, the check valve with a set-pressure adjuster 27 allows the one-way flow of the oil, but the first opening/closing valve 9 is closed due to the operation of the centrifugal governor G, and therefore travel while working can be achieved. When the number of revolutions of the engine E is reduced due to overload, the centrifugal governor G detects this and controls the opening degree of the first opening/closing valve 9 to control the overload. When the adjustable swash plate control lever 32a is in the working speed position, the overload control can be actuated or non-actuated by controlling the set pressure of the check valve with a set-pressure adjuster 27 by manually shifting the intermediate switching lever 131. When the adjustable swash plate control lever 32a is in the non-working speed position, the check valve with a set-pressure adjuster 27 blocks the one-way flow of the oil, and this allows the snowplow to travel.

Figure 23:
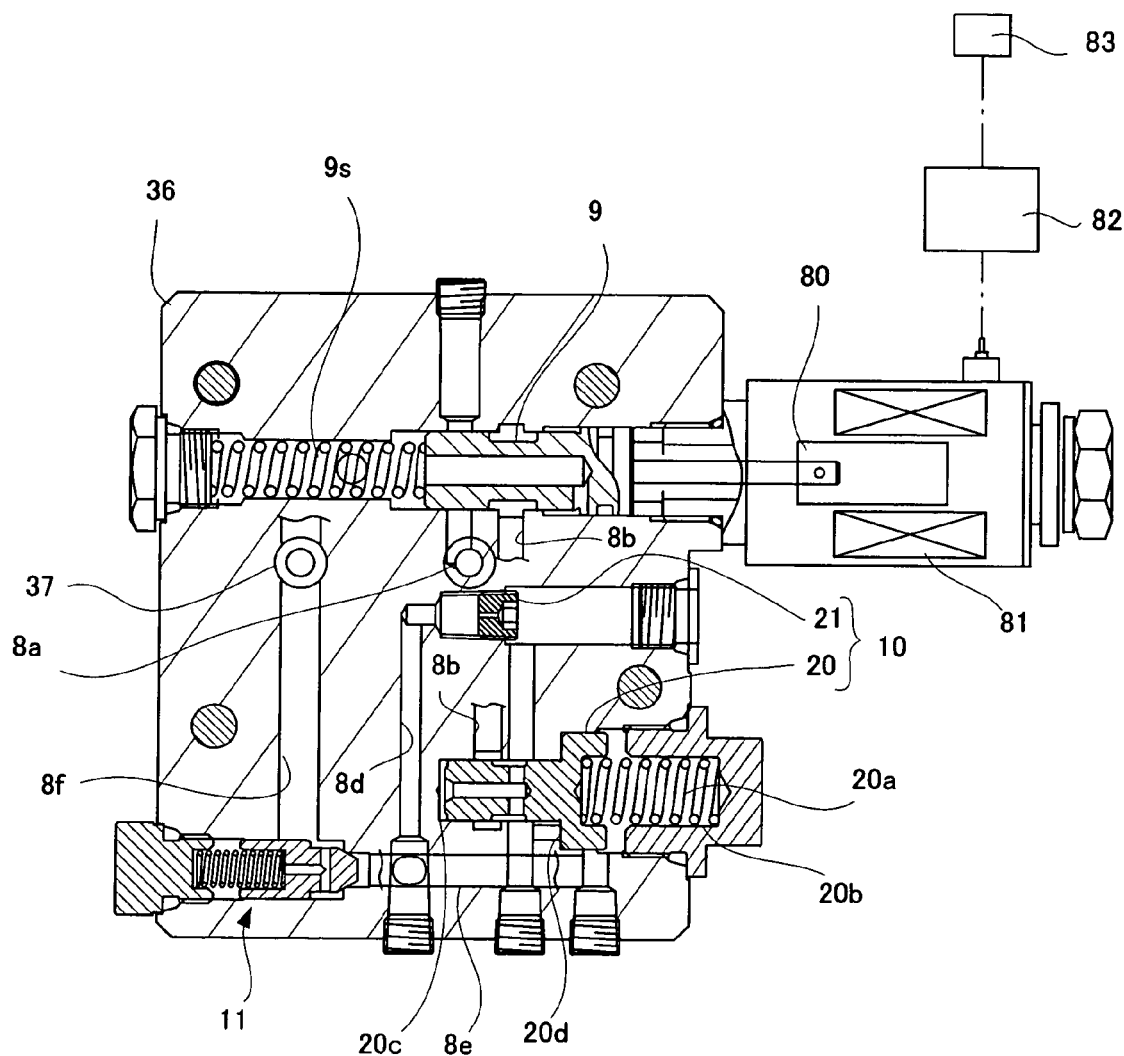
FIG. 23 is an enlarged vertical longitudinal sectional view that corresponds to FIG. 4 showing a load controller according to the tenth embodiment of the present invention.

A tenth embodiment of the load controller for a hydrostatic transmission mounted on a work vehicle of the present invention is explained below with reference to FIG. 23. In the sixth embodiment, the opening/closing valve controller is formed as a means for detecting the overload applied to the engine, which detects the increase in the temperature of the exhaust discharged from the engine and opens the opening/closing valve depending on the increase of the temperature of the exhaust.

Figure 6:
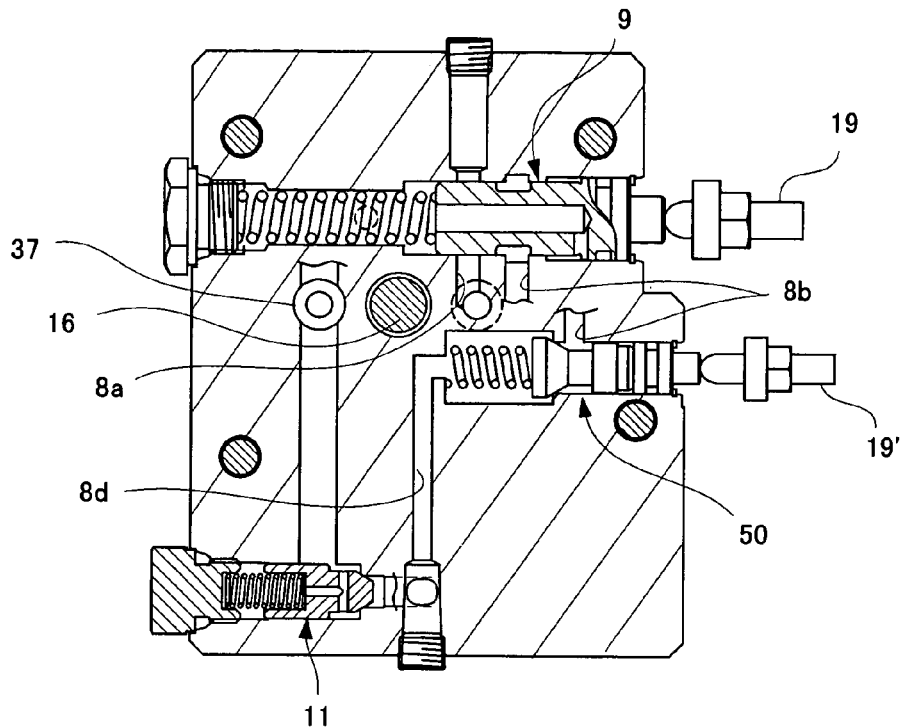
FIG. 6 is a longitudinal sectional view of a load controller according to the third embodiment of the present invention.

As shown in FIG. 6, the first opening/closing valve 9 is a solenoid-operated valve. The first opening/closing valve 9 is interlocked with a movable iron core 80, and driven by passing electric current through a proportional solenoid coil 81. The first opening/closing valve 9 is driven using a controller 82, and the controller 82 receives the temperature signals from a exhaust temperature sensor 83. The exhaust temperature sensor 83 is disposed in a manifold (not shown) in the engine E. In other respects, the tenth embodiment has the same structure as the above-described first embodiment, and therefore a detailed explanation is omitted here. In the structure shown in the figure, the controller 82 opens the first opening/closing valve 9 when the exhaust temperature detected by the exhaust temperature sensor 83 is, for example, 600° C. or higher. It is also possible to control the opening or closing of the first opening/closing valve 9 by detecting the temperature of the working oil stored in an oil pan or the like in the engine and by opening the first opening/closing valve 9 depending on the increase in the temperature. The load controller of the sixth embodiment may be applied to the load controllers of the second to fourth embodiments.

Although not shown in the figure, instead of using the exhaust temperature sensor, it is also possible to structure the opening/closing valve controller so that an overload applied to the engine is detected by detecting the oil pressure in the oil line that has high pressure during forward movement, and having the controller open the opening/closing valve (solenoid-operated valve) depending on the decrease in the oil pressure. In this case, it is possible to control the opening or closing of the first opening/closing valve in such a manner that the first opening/closing valve 9 is open when the detected oil pressure is below 100 kg/cm$^2$.

The invention claimed is:

1. A load controller provided in a hydrostatic transmission for a work vehicle, wherein power supplied from an engine is branched to drive an implement system and a traveling system, and a hydrostatic transmission is provided in the traveling system; the hydrostatic transmission connecting, in an oil-hydraulic closed circuit, an oil-hydraulic pump driven by the engine and an oil-hydraulic motor driven by the oil-hydraulic pump; the load controller comprising:

a bypass oil line for bypassing an oil line that has high pressure during forward movement in the oil-hydraulic closed circuit to reach an oil line that has low pressure during forward movement or an oil tank; a first opening/closing valve for opening or closing the bypass oil line;

an opening/closing valve controller that detects a load applied to the engine while traveling during working and opens the first opening/closing valve when the load exceeds a predetermined level;

a second opening/closing valve on the valve-outlet side of the first opening/closing valve that opens or closes the bypass oil line by external operation; and a flow control valve between the first opening/closing valve and the second opening/closing valve.

2. A load controller according to claim 1, wherein the opening/closing valve controller comprises a centrifugal governor that detects the number of revolutions of an output shaft of the engine or a revolution number detection shaft connected to the output shaft and opens the first opening/closing valve depending on the number of revolutions.

3. A load controller according to claim 2, wherein the centrifugal governor is disposed on a rotating axis that operates in collaboration with the oil-hydraulic pump of the hydrostatic transmission, and the centrifugal governor is provided in the hydrostatic transmission together with the load controller.

4. A load controller according to claim 3, wherein the centrifugal governor is housed in a closed chamber adjacent to the load controller, lubricating oil is held in the closed chamber, and the centrifugal governor comprises a flyweight and is structured so that the surface of the lubricating oil comes into contact with the flyweight when the flyweight opens.

5. A load controller according to claim 1, wherein the first and second opening/closing valves and the flow control valve are housed in a same valve casing.

6. A load controller provided in a hydrostatic transmission for a work vehicle, wherein power supplied from an engine is branched to drive an implement system and a traveling system, and a hydrostatic transmission is provided in the traveling system; the hydrostatic transmission connecting, in an oil-hydraulic closed circuit, an oil-hydraulic pump driven by the engine and an oil-hydraulic motor driven by the oil-hydraulic pump; the load controller comprising:

a bypass oil line for bypassing an oil line that has high pressure during forward movement in the oil-hydraulic closed circuit to reach an oil line that has low pressure during forward movement or an oil tank;

a first opening/closing valve for opening or closing the bypass oil line;

an opening/closing valve controller that detects a load applied to the engine while traveling during working and opens the first opening/closing valve when the load exceeds a predetermined level; and a second opening/closing valve on the valve-outlet side of the first opening/closing valve that opens or closes the bypass oil line by external operation;

the work vehicle comprising:

a clutch for an implement that supplies and halts transmission of power from the engine to the implement system;

a clutch lever for an implement for operating the clutch for the implement; and a clutch interlocking system for an implement that connects the clutch lever for the implement to the second opening/closing valve;

the clutch interlocking system for implement being structured so as to open the second opening/closing valve when the clutch lever for the implement is in the ON position and close the second opening/closing valve when the clutch lever for the implement is in the OFF position.

7. A load controller according to claim 6, wherein an intermediate switching mechanism that can open or close the second opening/closing valve when the clutch lever for the implement is in the ON position is provided in a clutch interlocking system for the implement.

8. A load controller provided in a hydrostatic transmission for a work vehicle, wherein power supplied from an engine is branched to drive an implement system and a traveling system, and a hydrostatic transmission is provided in the traveling system; the hydrostatic transmission connecting, in an oil-hydraulic closed circuit, an oil-hydraulic pump driven by the engine and an oil-hydraulic motor driven by the oil-hydraulic pump; the load controller comprising:
   a bypass oil line for bypassing an oil line that has high pressure during forward movement in the oil-hydraulic closed circuit to reach an oil line that has low pressure during forward movement or an oil tank;
   a first opening/closing valve for opening or closing the bypass oil line;
   an opening/closing valve controller that detects a load applied to the engine while traveling during working and opens the first opening/closing valve when the load exceeds a predetermined level; and
   a second opening/closing valve on the valve-outlet side of the first opening/closing valve that opens or closes the bypass oil line by external operation; the work vehicle comprising:
   a speed change gear in the traveling system for switching the traveling speed between a working speed and a non-working speed;
   a gearshift for controlling the speed change gear; and
   a gearshift interlocking system for connecting the gearshift and the second opening/closing valve;
   the gearshift interlocking system being so structured so as to open the second opening/closing valve when the gearshift is at a working speed position, and to close the second opening/closing valve when the gearshift is at a non-working speed position.

9. A load controller according to claim 8, wherein an intermediate switching mechanism that can open or close the second opening/closing valve when the speed change gear is at a working speed position is provided in the gearshift interlocking system.

10. A load controller provided in a hydrostatic transmission for a work vehicle, wherein power supplied from an engine is branched to drive an implement system and a traveling system, and a hydrostatic transmission is provided in the traveling system; the hydrostatic transmission connecting, in an oil-hydraulic closed circuit, an oil-hydraulic pump driven by the engine and an oil-hydraulic motor driven by the oil-hydraulic pump; the load controller comprising:
   a bypass oil line for bypassing an oil line that has high pressure during forward movement in the oil-hydraulic closed circuit to reach an oil line that has low pressure during forward movement or an oil tank;
   a first opening/closing valve for opening or closing the bypass oil line;
   an opening/closing valve controller that detects a load applied to the engine while traveling during working and opens the first opening/closing valve when the load exceeds a predetermined level; and
   a second opening/closing valve on the valve-outlet side of the first opening/closing valve that opens or closes the bypass oil line by external operation;
   either the oil-hydraulic pump or the oil-hydraulic motor having an adjustable swash plate, an adjustable swash plate control lever for adjusting the inclination angle of the adjustable swash plate, and an adjustable swash plate interlocking system for connecting the adjustable swash plate control lever to the second opening/closing valve;
   the adjustable swash plate interlocking system opening the second opening/closing valve when the adjustable swash plate control lever is at a working speed position and closing the second opening/closing valve when the adjustable swash plate control lever is at a non-working speed position.

11. A load controller according to claim 10, wherein an intermediate switching mechanism that can open or close the second opening/closing valve when the adjustable swash plate control lever is at a working speed position is provided in the adjustable swash plate interlocking system.

12. A load controller provided in a hydrostatic transmission for a work vehicle, wherein power supplied from an engine is branched to drive an implement system and a traveling system, and a hydrostatic transmission is provided in the traveling system; the hydrostatic transmission connecting, in an oil-hydraulic closed circuit, an oil-hydraulic pump driven by the engine and an oil-hydraulic motor driven by the oil-hydraulic pump; the load controller comprising:
   a bypass oil line for bypassing an oil line that has high pressure during forward movement in the oil-hydraulic closed circuit to reach an oil line that has low pressure during forward movement or an oil tank;
   a first opening/closing valve for opening or closing the bypass oil line;
   an opening/closing valve controller that detects a load applied to the engine while traveling during working and opens the first opening/closing valve when the load exceeds a predetermined level; and
   a check valve with a set-pressure adjuster in the valve-outlet side of the first opening/closing valve; the check valve with a set-pressure adjuster allowing only a one-way flow of a working oil from the valve-outlet side of the first opening/closing valve in the bypass oil line and having the ability to stop the one-way flow by external operation.

13. A load controller according to claim 12, wherein the check valve with a set-pressure adjuster comprises a valve body, spring, and movable spring receiver, the work vehicle comprising a clutch for the implement to supply and halt power transmission from the engine to the implement system, a clutch lever for the implement that controls the clutch for the implement, and a clutch/check valve interlocking system that connects the clutch lever for the implement to the movable spring receiver, the clutch/check valve interlocking system being structured so as to increase the set pressure of the spring by turning off the clutch lever for the implement and transferring the movable spring receiver toward the valve body, and to stop the one-way flow in the bypass oil line at the OFF position of the clutch for the implement, and comprising an intermediate switching mechanism being able to control the set pressure of the check valve with a set-pressure adjuster when the clutch for the implement is at the ON position.

14. A load controller according to claim 12, wherein the cheek valve with a set-pressure adjuster comprises a valve body, spring, and movable spring receiver, the work vehicle comprising a speed change gear in the traveling system that can switch the traveling speed between a working speed and a non-working speed; a gearshift for controlling the speed change gear; and a speed change gear/check valve interlocking system that connects the gearshift to the movable spring receiver, the speed change gear/check valve interlocking system being structured so as to increase the set pressure of the spring by moving the movable spring receiver toward the valve body when the gearshift is in a traveling speed position and stopping the one-way flow; and comprising an intermediate switching mechanism being able to control the set pressure of the check valve with a set-pressure adjuster when the speed change gear is in a traveling speed position.

15. A load controller according to claim 12, wherein the check valve with a set-pressure adjuster comprises a valve body, spring, and movable spring receiver; the work vehicle comprising an adjustable swash plate control lever to provide the oil-hydraulic pump of the hydrostatic transmission with stepless speed variation, and an adjustable swash plate/check valve interlocking system that connects the adjustable swash plate control lever to the movable spring receiver, the adjustable swash plate/check valve interlocking system being structured so as to increase the set pressure of the spring by moving the movable spring receiver toward the valve body when the adjustable swash plate control lever is at a non-working speed position, and to stop the one-way flow; and comprising an intermediate switching mechanism being able to control the set pressure of the check valve with a set-pressure adjuster when the adjustable swash plate control lever is in a working speed position.

* * * * *